US012668538B2

(12) United States Patent
Hemphill et al.

(10) Patent No.: US 12,668,538 B2
(45) Date of Patent: Jun. 30, 2026

(54) HIGH TEMPERATURE SAG RESISTANT LIGHTWEIGHT GYPSUM BOARD

(71) Applicant: KNAUF GIPS KG, Iphofen (DE)

(72) Inventors: Mark Hemphill, Hawthron Woods, IL (US); Qinghua Li, Rolling Meadows, IL (US)

(73) Assignee: KNAUF GIPS KG, Iphofen (DE)

( * ) Notice: Subject to any disclaimer, the term of this patent is extended or adjusted under 35 U.S.C. 154(b) by 740 days.

(21) Appl. No.: 17/658,122

(22) Filed: Apr. 6, 2022

(65) Prior Publication Data

US 2022/0356114 A1 Nov. 10, 2022

Related U.S. Application Data

(60) Provisional application No. 63/185,622, filed on May 7, 2021.

(51) Int. Cl.
| | |
|---|---|
| *C04B 11/00* | (2006.01) |
| *C04B 103/10* | (2006.01) |
| *C04B 103/20* | (2006.01) |
| *C04B 103/40* | (2006.01) |
| *C04B 111/00* | (2006.01) |

(52) U.S. Cl.
CPC .......... *C04B 11/00* (2013.01); *C04B 2103/10* (2013.01); *C04B 2103/20* (2013.01); *C04B 2103/408* (2013.01); *C04B 2111/0062* (2013.01)

(58) Field of Classification Search
CPC . C04B 11/00; C04B 2103/10; C04B 2103/20; C04B 2103/408; C04B 2111/0062; C04B 2111/00629; C04B 2111/28; C04B 28/145; C04B 14/10; C04B 14/202; C04B 14/42; C04B 14/46; C04B 22/16; C04B 24/124; C04B 24/126; C04B 24/38; C04B 2103/12; C04B 2103/22

See application file for complete search history.

(56) References Cited

U.S. PATENT DOCUMENTS

| | | | |
|---|---|---|---|
| 2,239,925 A | 4/1941 | Mckee et al. | |
| 3,454,456 A | 7/1969 | Willey | |
| | (Continued) | | |

FOREIGN PATENT DOCUMENTS

| | | |
|---|---|---|
| CN | 1169402 A | 1/1998 |
| CN | 106116432 A | 11/2016 |
| | (Continued) | |

OTHER PUBLICATIONS

USG Sheetrock® Brand UltraLight Panels Firecode® X (UL Type ULX), 2020.

(Continued)

*Primary Examiner* — K. Boyle
(74) *Attorney, Agent, or Firm* — Pradip Sahu; Maryellen Feehery Hank; Vorys Sater Seymour & Pease LLP

(57) ABSTRACT

A high temperature sag resistant lightweight wallboard. The addition of a small amount of urea (about 0.1%) significantly improves the high-temperature sag resistance on Type X gypsum wallboards. These gypsum wallboards may have a board weight of less than 2100 lbs/msf when cast to have an overall 5.8 inch thickness, and may include glass fibers and/or mineral wool. Also, methods of making the gypsum wallboard and a wall system for employing the gypsum wallboard.

19 Claims, 5 Drawing Sheets

(56) References Cited

U.S. PATENT DOCUMENTS

| | | | |
|---|---|---|---|
| 4,327,146 | A | 4/1982 | White |
| 5,643,510 | A | 7/1997 | Sucech |
| 5,683,635 | A | 11/1997 | Sucech et al. |
| 5,718,797 | A | 2/1998 | Phillips et al. |
| 6,342,284 | B1 | 1/2002 | Yu et al. |
| 6,494,609 | B1 | 12/2002 | Wittbold et al. |
| 6,632,550 | B1 | 10/2003 | Yu et al. |
| 6,694,695 | B2 | 2/2004 | Collins et al. |
| 6,815,049 | B2 | 11/2004 | Veeramasuneni et al. |
| 6,822,033 | B2 | 11/2004 | Yu et al. |
| 6,874,930 | B2 | 4/2005 | Wittbold et al. |
| 7,364,676 | B2 | 4/2008 | Sucech et al. |
| 7,731,794 | B2 | 6/2010 | Yu et al. |
| RE41,592 | E | 8/2010 | Lynn et al. |
| 7,815,730 | B2 | 10/2010 | Wang et al. |
| 8,034,203 | B2 | 10/2011 | Xu et al. |
| 8,323,785 | B2 * | 12/2012 | Yu ........................... B28B 11/12 |
| | | | 106/788 |
| 9,321,685 | B2 | 4/2016 | Ataka et al. |
| 10,377,108 | B2 | 8/2019 | Chan et al. |
| 10,421,250 | B2 | 9/2019 | Li et al. |
| 10,662,113 | B2 | 5/2020 | Brooks et al. |
| 10,875,935 | B2 | 12/2020 | Sang et al. |
| 10,988,413 | B2 | 4/2021 | Fisher |
| 2010/0247937 | A1 | 9/2010 | Liu et al. |
| 2012/0168527 | A1 | 7/2012 | Li et al. |
| 2012/0170403 | A1 | 7/2012 | Li et al. |
| 2012/0219785 | A1 | 8/2012 | Yu et al. |
| 2013/0330532 | A1 | 12/2013 | Dierschke et al. |
| 2014/0158273 | A1 | 6/2014 | Yu et al. |
| 2016/0258157 | A1 | 9/2016 | Yu et al. |
| 2016/0376191 | A1 * | 12/2016 | Li ......................... B32B 37/144 |
| 2018/0346383 | A1 * | 12/2018 | Bailey .................... C04B 28/14 |
| 2019/0382589 | A1 | 12/2019 | Li et al. |
| 2020/0055277 | A1 * | 2/2020 | Hemphill ................ C04B 28/14 |
| 2020/0225746 | A1 | 7/2020 | Bar-Zeev et al. |

FOREIGN PATENT DOCUMENTS

| | | |
|---|---|---|
| CN | 108947575 A | 12/2018 |
| DE | 102006018356 B3 | 9/2007 |
| EP | 585200 A2 | 3/1994 |
| EP | 2246500 A2 | 11/2010 |
| EP | 3237350 B1 | 10/2019 |
| FR | 2779715 B1 | 10/2003 |
| SU | 1217839 A1 | 3/1986 |
| WO | 2020068368 A1 | 4/2020 |
| WO | 2020225746 A1 | 11/2020 |

OTHER PUBLICATIONS

Section 09 29 00—Gypsum Board, ⅝ in. (15.9 mm) USG Sheet-rock® Brand UltraLight Panels Firecode® X (UL Type ULX) WB2931-ENG-USA/rev. Apr. 2020, USG Corporation 2020.
International Search Report mailed Sep. 6, 2022 to Knauf Gips KG for PCT/EP2022/025202 filed May 3, 2022.

* cited by examiner

FIG. 1
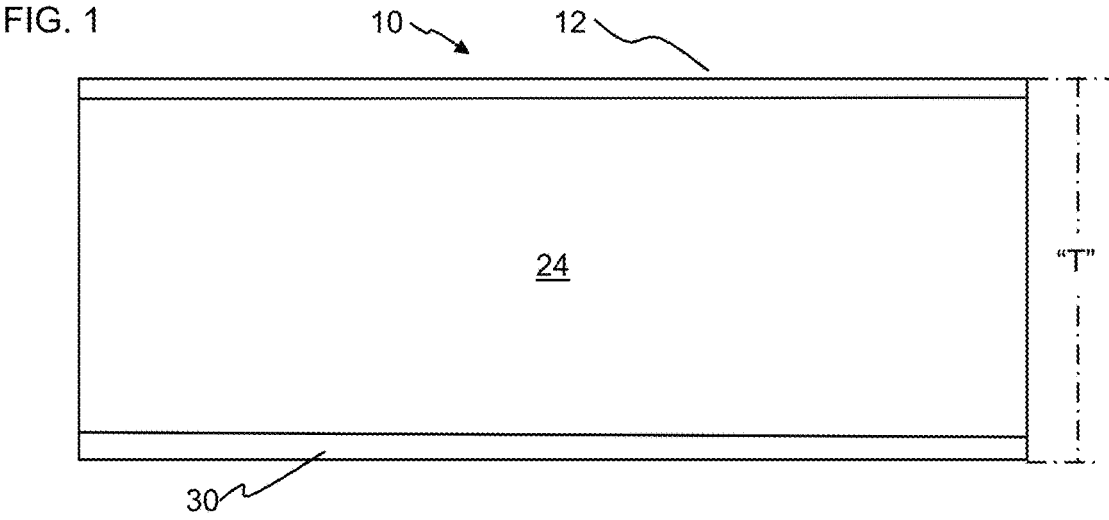
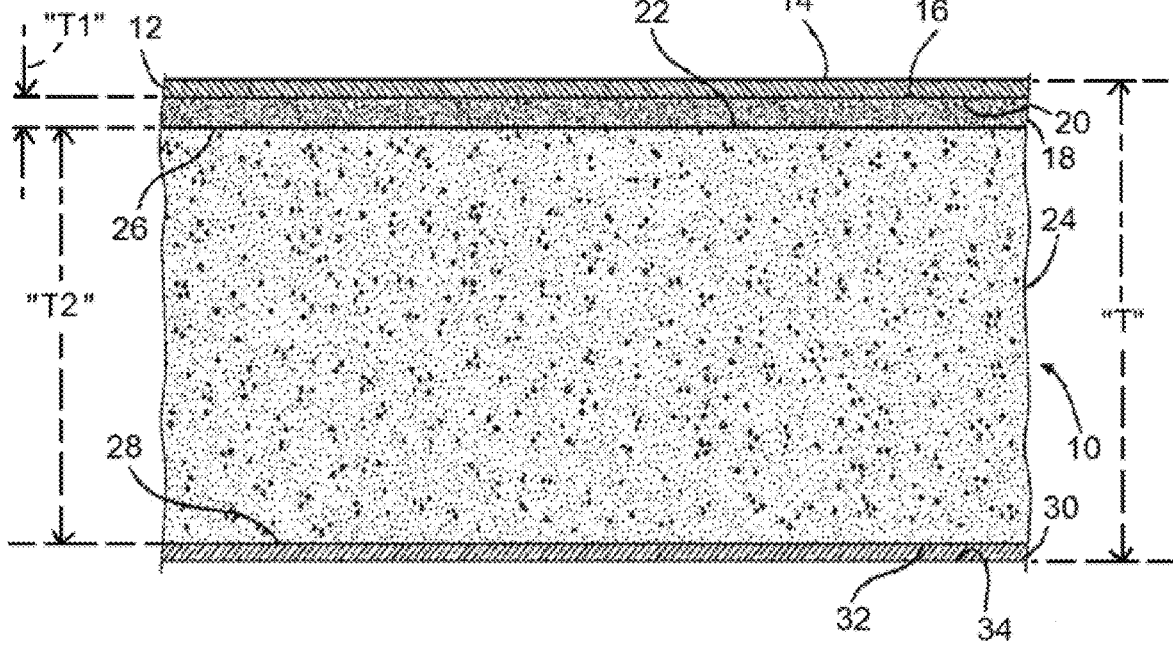
FIG. 2

HIGH TEMPERATURE SAG RESISTANT LIGHTWEIGHT GYPSUM BOARD

FIELD OF THE INVENTION

The present invention relates to a high temperature sag resistant lightweight board. The addition of urea significantly improves the thermal sag on Type X gypsum boards. These gypsum boards may have a board weight of less than 2100 lbs/msf, and may comprise glass fibers and/or mineral wool. The present invention also provides methods of making the gypsum board and a wall system for employing the gypsum board.

BACKGROUND OF THE INVENTION

In the construction of buildings, one of the more common building elements for construction and remodeling is gypsum board, often known as drywall, gypsum wallboards, gypsum panels, gypsum paneling, and ceiling tiles. Gypsum (calcium sulfate dihydrate and any impurities) suitable for use in wallboard may be obtained from both natural and synthetic sources, followed by further processing. In chemical terms, gypsum contains calcium sulfate dihydrate $(CaSO_4 \cdot 2H_2O)$.

Set gypsum is a well-known material that is used in such products. Panels containing set gypsum are often referred to as gypsum boards, which contain a board core layer (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core layer, usually at an interface (bond surface) between the board core layer and an inner surface of a cover sheet. The denser regions may be contiguous with a less dense region of the gypsum core following setting of the gypsum.

During manufacture of a gypsum board, stucco (containing calcium sulfate hemihydrate and any impurities, also known as calcined gypsum), water, and other ingredients as appropriate may be mixed, typically in a mixer to form an aqueous gypsum slurry. As used herein, the terms "stucco" and "calcined gypsum" refer to both the hemihydrate and anhydrite forms of calcium sulfate that may be contained therein. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying an optional first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum. The desired hydration of the calcined gypsum promotes formation of an interlocking matrix of set gypsum crystals, thereby imparting strength to the gypsum board. The resulting set gypsum product may then be cut into standard lengths as known in the art. Heat may be applied (e.g., using a kiln) to drive off the remaining free (i.e., unreacted) water to yield a dry product.

When calcium sulfate dihydrate is heated sufficiently, in a process called calcining or calcination, the water of hydration is at least partially driven off and there can be formed either calcium sulfate hemihydrate $$(CaSO_4 \cdot 1/2H_2O)$$

or calcium sulfate anhydrite $(CaSO_4)$ depending on the temperature and duration of exposure. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Should a finished gypsum product be exposed to relatively high temperatures, such as those produced by high temperature flames or gases, portions of the gypsum may absorb sufficient heat to start the release of water from the gypsum dihydrate crystals of the core. The absorption of heat and release of water from the gypsum dihydrate may be sufficient to retard heat transmission through or within the gypsum product for a time. The gypsum product can act as a barrier to prevent high temperature from passing directly therethrough. The heat absorbed by the gypsum product can be sufficient to essentially recalcine portions of the gypsum, depending on the heat source temperatures and exposure time. At certain temperature levels, the heat applied to a gypsum product also may cause phase changes to the anhydrite of the gypsum and rearrangement of the crystalline structures. In some instances, the presence of salts and impurities may affect the phase transition temperatures, resulting in a difference in crystal morphologies.

Gypsum panels have been produced that resist the effects of relatively high temperatures for a period of time, which may inherently delay passage of high heat levels through or between the panels, and into (or through) systems using them. Gypsum panels referred to as fire resistant or "fire rated" typically are formulated to enhance the panels' ability to delay the passage of heat though wall or ceiling structures and play an important role in controlling the spread of fire within buildings. As a result, building code authorities and other concerned public and private entities typically set stringent standards for the fire resistance performance of fire rated gypsum panels.

The ability of gypsum panels to resist fire and the associated extreme heat may be evaluated by carrying out generally accepted tests. Examples of such tests are routinely used in the construction industry, such as the procedures described in the specifications of E119-20, Standard Test Methods for Fire Tests of Building Construction and Materials, published by the American Society for Testing and Materials (ASTM International), West Conshohocken, PA, 2020. Some of such tests comprise constructing test assemblies using gypsum panels, normally a single-layer application of the panels on each face of a wall frame formed by wood or steel studs. Depending on the test, the assembly may or may not be subjected to load forces. The face of one side of the assembly, such as an assembly constructed according to those published by Underwriters Laboratories ("UL") as UL U305, U419 and U423, for example, is exposed to increasing temperatures for a period of time in accordance with a heating curve, such as those discussed in the ASTM E119-20 procedures.

The temperatures proximate the heated side and the temperatures at the surface of the unheated side of the assembly are monitored during the tests to evaluate the temperatures experienced by the exposed gypsum panels and the heat transmitted through the assembly to the unexposed panels. The tests are terminated upon one or more structural failures of the panels and/or when the temperatures on the unexposed side of the assembly exceed a predetermined threshold. Typically, these threshold temperatures are based on the maximum temperature at any one of such sensors and/or the average of the temperature sensors on the unheated side of the assembly.

Test procedures, such as those set forth in ASTM E119-20, are directed to an assembly's resistance to the transmission of heat through the assembly as a whole. The tests also provide, in one aspect, a measure of the resistance of the gypsum panels used in the assembly to shrinkage in the x-y direction (width and length) as the assembly is subjected to high temperature heating. Such tests also provide a measure of the panels' resistance to losses in structural integrity that result in opening gaps or spaces between panels in a wall assembly, with the resulting passage of high temperatures into the interior cavity of the assembly. In another aspect, the tests provide a measure of the gypsum panels' ability to resist the transmission of heat through the panels and the assembly. It is believed that such tests reflect the specified system's capability for providing building occupants and firemen/fire control systems a window of opportunity to address or escape fire conditions.

In the past, various strategies were employed to improve the fire resistance of fire rated gypsum panels. For example, thicker, denser panel cores have been provided which use more gypsum relative to less dense gypsum panels, and therefore include an increased amount of water chemically bound within the gypsum (calcium sulfate dihydrate), to act as a heat sink, to reduce panel shrinkage, and to increase the structural stability and strength of the panels. Alternatively, various ingredients including glass fiber and other fibers have been incorporated into the gypsum core to enhance the gypsum panel's fire resistance by increasing the core's tensile strength and by distributing shrinkage stresses throughout the core matrix. Similarly, amounts of certain clays, such as those of less than about one micrometer size, and colloidal silica or alumina additives, such as those of less than one micrometer size, have been used in the past to provide increased fire resistance (and high temperature shrinkage resistance) in a gypsum panel core. It has been recognized, however, that reducing the weight and/or density of the core of gypsum panels by reducing the amount of gypsum in the core will adversely affect the structural integrity of the panels and their resistance to fire and high heat conditions.

Another approach, has been to add unexpanded vermiculite (also referred to as vermiculite ore) and mineral or glass fibers into the core of gypsum panels. In such approaches, the vermiculite is expected to expand under heated conditions to compensate for the shrinkage of the gypsum components of the core. The mineral/glass fibers were believed to hold portions of the gypsum matrix together. U.S. Pat. No. 3,454,456 to Willey discloses distributing unexpanded vermiculite (also referred to as vermiculite ore) of specified particle size throughout a core of gypsum wallboard. At least about 0.1%, by weight of mineral fibers and boric acid may also be dispersed throughout the core.

U.S. Pat. No. 8,323,785 to Yu et al., incorporated herein by reference, discloses a reduced weight, reduced density gypsum panel that includes high expansion vermiculite with fire resistance capabilities that are at least comparable to (if not better than) commercial fire rated gypsum panels with a much greater gypsum content, weight and density.

U.S. Pat. No. 10,377,108 to Yu et al., incorporated herein by reference, teaches that at least one high efficiency heat sink additive, e.g., aluminum trihydrate is incorporated into a gypsum product to increase heat resistance. Further, phosphate salt or other source of phosphate ions is added to the gypsum slurry used to produce the gypsum product, e.g., a panel gypsum core. The use of such phosphates can contribute to providing a gypsum core with increased strength, resistance to permanent deformation (e.g., sag resistance), and dimensional stability, compared with set gypsum formed from a mixture containing no phosphate.

There is a continuing need to develop gypsum products, e.g., at lower weight, that are less susceptible to the damaging effects of extreme heat.

The prior art teaches the use of urea resins or urea complexes in gypsum boards for various reasons including increasing wall strength (for example EP0585200, CN108947575, WO 2020/225746, U.S. Pat. No. 10,377,108). Other prior art teaches starch urea phosphate for high strength gypsum boards (for example U.S. Pat. No. 9,321,685. Phase change materials are used in gypsum boards with urea to provide a self-extinguishing feature (for example FR2779715).

Other prior art teaches applying urea as a coating for a fire wall (DE 102006018356), or decreasing emissions from the coating (US 2010/0382589).

It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The present invention provides the ability to reduce thermal sag in lightweight gypsum boards with the incorporation of 0.03-1 wt. % urea distributed uniformly throughout the set gypsum core.

The invention provides a high temperature sag resistant, ultralight weight gypsum board containing urea dispersed in its gypsum core. Ultralight weight means a ⅝ inch gypsum board having a mass of pounds per area less than 2100 lbs/msf, preferably less than 2000 lbs/msf. For example, a gypsum board having a mass of pounds per area of 500 to less than 2100 lbs/msf, preferably 500 to less than 2000 lbs/msf ("lbs/msf" means pounds per 1000 square feet.) The lbs/msf is based on the entire board including the gypsum core, any other gypsum layer(s), any cover sheets, and any other layers. The gypsum boards (including the gypsum core, any other gypsum layer(s), any cover sheets, and any other layers) typically have a thickness of ⅜"-1" (0.95-2.54 cm), more preferably ⅜"-⅝" (0.95-1.90 cm), typically ⅝ inch (1.59 cm). The gypsum board mass of pounds per area lbs/msf values are subject to proportional adjustment for thicker or thinner boards. For example, a half inch thick board has a mass of pounds per area less than 1680 lbs/msf, rather than less than 2100 lbs/msf as in the case of the ⅝ thick board. Generally, the gypsum core layer has a density of about 40 pounds per cubic foot or less. For example, 15 to 40 pounds per cubic foot, 20 to 40 pounds per cubic foot, or 30 to 40 pounds per cubic foot.

The invention provides gypsum boards comprising a gypsum core layer (also referred to as a board core layer) comprising at least 60 wt. % calcium sulfate dihydrate, preferably at least 70 wt. %, and more preferably at least 80 wt. %, typically at least 90 wt. % or at least 95 wt. % calcium sulfate dihydrate, and 0.03-1 wt. %, preferably 0.05-0.8 wt. %, more preferably 0.06-0.6 wt. %, most preferably 0.05-0.2 wt. %, for example 0.1-0.2 wt. % or 0.1-0.5 wt. %, urea distributed uniformly throughout the gypsum core, wherein the gypsum core layer has a density of about 40 pounds per cubic foot or less, and wherein the gypsum board has a mass of pounds per area less than 2100 lbs/msf, wherein the mass of pounds per area lbs/msf values are for a nominally ⅝ inch (1.59 cm) thick board and subject to proportional adjustment for thicker or thinner boards.

Preferably the gypsum core layer is effective to provide a Thermal Insulation Index (TI) of about 20 minutes or greater, for example greater than 30 minutes.

Preferably the gypsum core layer is effective to provide a High Temperature Shrinkage (S) of about 10% or less.

The gypsum core may further comprise additives such as phosphate, perlite, starch, fiberglass, and/or vermiculite.

The gypsum board may further comprise a front cover sheet and a back cover sheet, wherein the gypsum core layer is disposed between the front cover sheet and the back cover sheet. In the alternative one of the front or back cover sheets may be omitted.

The front cover sheet has an outer surface and an inner surface, wherein its inner surface faces a first face of the gypsum core layer. The back cover sheet has an outer surface and an inner surface, wherein its inner surface faces a second face of the gypsum core layer. Generally the outer surface of the front cover sheet faces outwardly from the wall frame once the gypsum board has been installed on a wall frame. The materials of the cover sheets may be independently selected from paper, fiber glass, or mineral wool fiber. The front and back cover sheets may be of the same or different material. For example, if both of the cover sheets are paper cover sheets, the paper cover sheets may be the same or different paper materials. Typically the front and back cover sheets materials are nonwoven mats.

Optionally, various additives may be present in the board core layer or a gypsum slurry used to form the board core layer. Optionally siloxane may be used to improve water resistance in the gypsum board. Optionally, the board core layer may further comprise vermiculite or other high expansion particles to improve fire resistance in the gypsum board. The board core layer may further comprise one or more high-density regions (skim layers) in contact with the inner surface of the front cover sheet or the back cover sheet and coated thereon. The one or more high-density regions may be in contact with a relatively lower-density interior of the board core layer.

The present invention also provides methods for preparing a gypsum board which comprises:

preparing an aqueous slurry comprising a mixture of water, stucco, and urea, wherein the stucco comprises calcium sulfate hemihydrate, wherein the aqueous slurry comprises a mixture of:

at least 60 wt. %, preferably at least 70 wt. %, more preferably at least 80 wt. %, typically at least 90 wt. % or typically at least 95 wt. % said calcium sulfate hemihydrate on a dry (water free) basis, 0.03-1 wt. %, preferably 0.05-0.8 wt. %, more preferably 0.06-0.6 wt. %, most preferably 0.05-0.2 wt. %, for example 0.1-0.2 wt. % or 0.1-0.5 wt. %, said urea on a dry (water free) basis, and the water at a weight ratio of water to the calcium sulfate hemihydrate of 0.2:1 to 1.2:1; and disposing a layer of the aqueous slurry on a surface and setting the calcium sulfate hemihydrate to form a set gypsum core layer comprising calcium sulfate dihydrate and the urea distributed uniformly throughout the set gypsum core layer; and cutting the set gypsum core layer into a gypsum board of pre-determined dimensions; and drying the gypsum board;

wherein the set gypsum core layer has a density (D) of about 40 pounds per cubic foot or less, and the gypsum board has a mass of pounds per area less than 2100 lbs/msf, wherein the lbs/msf values are for a ⅝ inch (1.59 cm) thick gypsum board and subject to proportional adjustment for thicker or thinner gypsum boards.

Preferably the set gypsum core layer is effective to provide a Thermal Insulation Index (TI) of about 20 minutes or greater, for example greater than 30 minutes.

Preferably the set gypsum core layer is effective to provide a High Temperature Shrinkage (S) of about 10% or less.

The deposited aqueous slurry may include calcium sulfate anhydrite, although it is preferably used in small amounts of less than 20 wt. % of the dry (water-free) materials of the aqueous slurry.

Typically, the gypsum core and the aqueous gypsum slurry have less than 10 wt. %, typically an absence, of Portland cement or other hydraulic cement on a dry (water-free) basis. Typically, the gypsum core and the aqueous gypsum slurry has less than 10 wt. %, more typically an absence, of fly ash on a dry (water-free) basis. Typically, the gypsum core and the aqueous gypsum slurry has less than 10 wt. %, more typically an absence, of calcium carbonate on a dry (water-free) basis.

The board core layer of the gypsum board resulting from setting the aqueous slurry comprises at least 60 wt. % calcium sulfate dihydrate, preferably at least 70 wt. %, and more preferably at least 80 wt. %, typically at least 90 wt. % or at least 95 wt. % calcium sulfate dihydrate, and 0.03-1 wt. %, preferably 0.05-0.8 wt. %, more preferably 0.06-0.6 wt. %, most preferably 0.05-0.2 wt. %, for example 0.1-0.2 wt. % or 0.1-0.5 wt. %, urea distributed uniformly throughout the gypsum core.

The gypsum boards of the invention may exhibit significant adhesion between the board core layer and the back cover sheet even when the gypsum board was prepared from gypsum sources having significant quantities of one or more extraneous chloride salts.

In one or more other aspects of the invention, the invention provides a wall system comprising framing to which is attached at least one gypsum board of the invention, wherein the outer surface of the front cover sheet faces away from the framing. In the wall system, the gypsum board may be on an interior wall or ceiling of a building. Typically, the framing is wood or metal. Typically, the at least one gypsum board is attached to the framing by any one or more of screws, nails, glue, or other mechanical fasteners.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

For purposes of this disclosure a dry basis is a water-free basis. For example, a dry wt. % amount of an ingredient of the aqueous slurry is the wt. % of the ingredient based on the dry (water-free) materials of the aqueous slurry.

For purposes of this disclosure all average molecular weights, percentages and ratios used herein, are by weight (i.e., wt. %) unless otherwise indicated.

BRIEF DESCRIPTION OF THE DRAWINGS

FIG. 1 shows a cross-sectional view of a gypsum board of the invention, in which a board core layer (gypsum core) is sandwiched between a front cover sheet and a back cover sheet, with the back cover sheet.

FIG. 2 shows a cross-sectional view of a gypsum board of the invention, in which a board core layer (gypsum core) with a skim layer is sandwiched between a front cover sheet and a back cover sheet, with the back cover sheet.

DETAILED DESCRIPTION OF THE INVENTION

Figure 3:
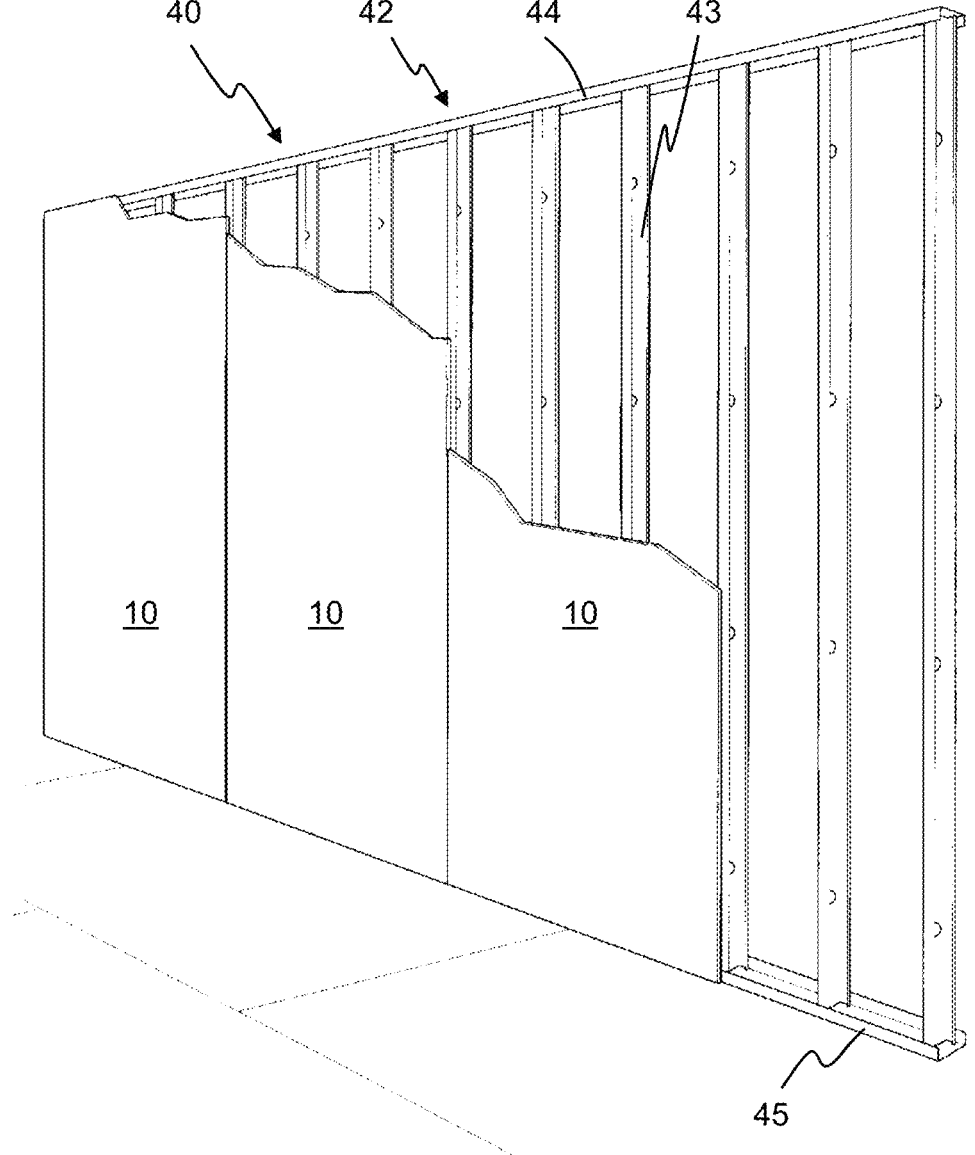
FIG. 3 shows a perspective view of a wall system of the present invention including the tile backer panel of the present invention attached to one side of a metal stud wall.
Figure 4:
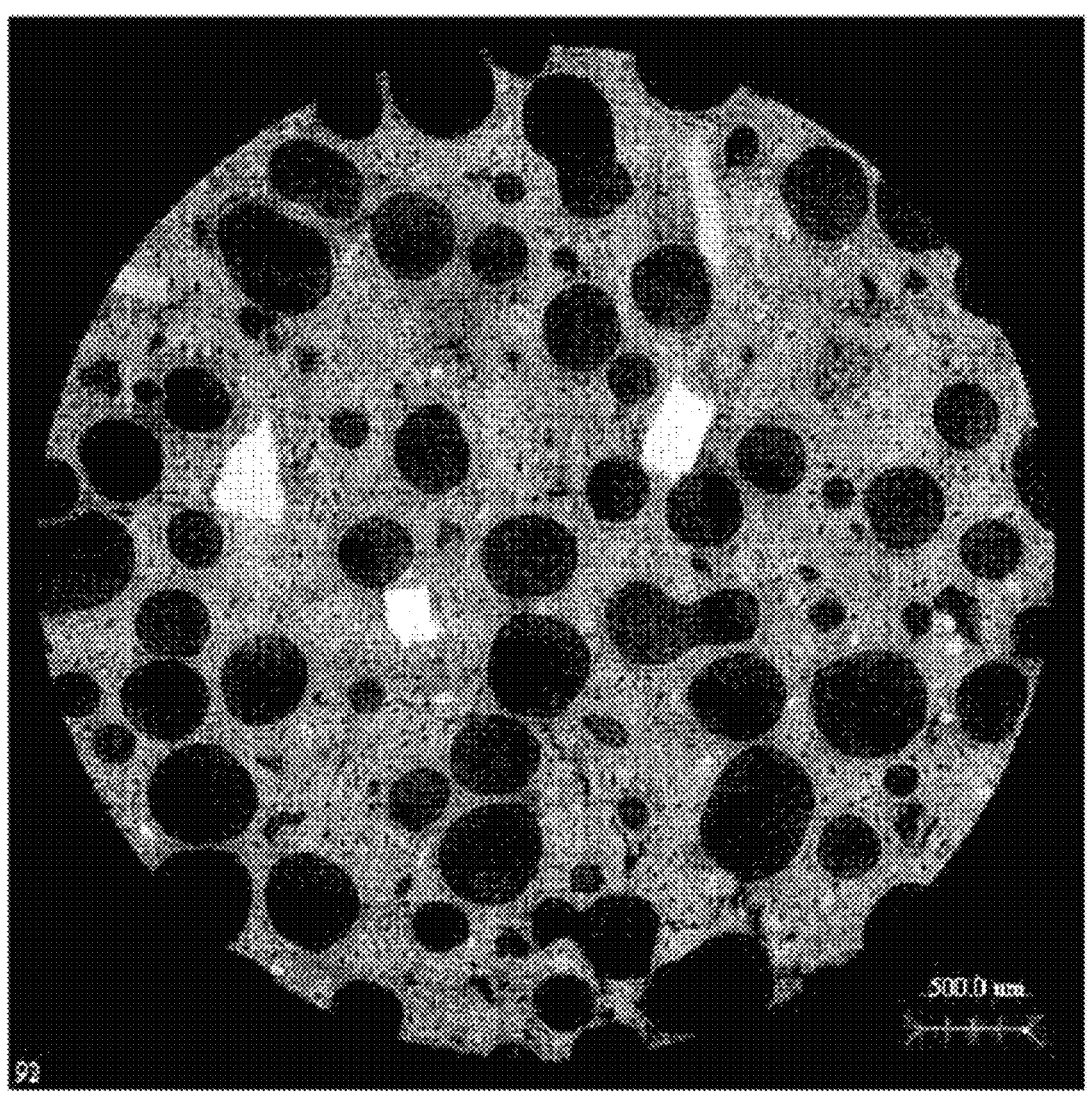
FIG. 4 is a two dimensional image developed from a micro CT-X-ray scan, as further discussed below, of a core section of a specimen comprising vermiculite from a nominal ⅝ inch thick, about 1880 lbs./msf exemplary panel.

FIG. 1 schematically shows an embodiment of a gypsum board 10 of the present invention comprising:

a gypsum core layer 24 (also referred to as a board core layer) comprising at least 60 wt. % calcium sulfate dihydrate, preferably at least 70 wt. %, and more preferably at least 80 wt. %, typically at least 90 wt. % or at least 95 wt. % calcium sulfate dihydrate, and 0.03-1 wt. %, preferably 0.05-0.8 wt. %, more preferably 0.06-0.6 wt. %, most preferably 0.05-0.2 wt. %, for example 0.1-0.2 wt. % or 0.1-0.5 wt. %, urea distributed uniformly throughout the gypsum core, wherein the gypsum core layer has a density of about 40 pounds per cubic foot or less, and wherein the gypsum board has a mass of pounds per area less than 2100 lbs/msf, wherein the lbs/msf values are for a ⅝ inch (1.59 cm) thick gypsum board and subject to proportional adjustment for thicker or thinner gypsum boards.

Preferably the set gypsum core layer is effective to provide a Thermal Insulation Index (TI) of about 20 minutes or greater, for example greater than 30 minutes.

Preferably the set gypsum core layer is effective to provide a High Temperature Shrinkage (S) of about 10% or less.

Thermal Insulation Index (TI) is measured as described in Example 4D of U.S. Pat. No. 8,323,785 B2 to Yu et al. High Temperature Thermal Insulation Index testing, pursuant to the procedures discussed in ASTM Pub. WK25392—Revision of C473-09 Standard Test Methods for Physical Testing of Gypsum Panel Products (herein after "ASTM Pub. WK25392") available from ASTM International, provides a simple, representative test of the high temperature thermal insulating characteristics of gypsum panels. The heat transfer conditions reflected in this test can be described by the energy equation (1) for one dimensional unsteady heat conduction through the board thickness:

$$\Delta / \Delta x (k(\Delta T / \Delta x)) + q = \rho c_p (\Delta T / \Delta t) \qquad (1)$$

where T is the temperature at a given time t and depth x in the board. The thermal conductivity (k), density (ρ), and specific heat ($c_p$) are nonlinear temperature dependent functions at elevated temperatures. The heat generation rate q represents a variety of endothermic and exothermic reactions, e.g., gypsum phase changes and face paper combustion, which occur at different temperatures and, correspondingly, at different times.

For the purpose of evaluating the total heat conduction through the gypsum board and, hence its thermal insulating performance, it typically is not necessary to separately measure and describe each variable mentioned above. It is sufficient to evaluate their net cumulative effect on heat transfer. For that purpose, the simple High Temperature Thermal Insulation Index test discussed in ASTM Pub. WK25392 was developed. "High Temperature Thermal Insulation Index" as used herein refers to a measure of the thermal insulation characteristics of gypsum panels under high temperature testing and sample conditions consistent with those described herein. Each test specimen consists of two 4 inch (100 mm) diameter disks clamped together by type G bugle head screws. A thermocouple is placed at the center of the specimen. The specimen then is mounted on edge in a rack designed to insure uniform heating over its surface and placed in a furnace pre-heated to about 930° F. (500° C.). The temperature rise at the center of the test specimen is recorded and a Thermal Insulation Index, TI, computed as the time, in minutes, required for the test specimen to heat from about 105° F. (40° C.) to about 390° F. (200° C.). The Thermal Insulation Index of the test specimen is calculated according to equation (2) as:

$$TI = t_{200°C.} - t_{40°C.} \qquad (2)$$

A temperature profile developed from data collected by this procedure often shows the transition from gypsum to hemihydrate at about 212° F. (100° C.) and the conversion of hemihydrate to the first anhydrite phase near about 285° F. (140° C.). Such data also often shows that once these phase transitions are completed, the temperature rises rapidly in a linear fashion as no further chemical or phase change reactions of significance typically occur below the oven temperature of about 930° F. (500° C.). By waiting until the specimen's core temperature has reached about 105° F. (40° C.) to begin timing, acceptable repeatability and reproducibility may be achieved.

FIG. 1 also shows optional front and back cover sheets on front and back sides of the gypsum core layer 24 of the board 10.

Typically the board 10 has a thickness "T" of ⅜ inch to 1 inch (0.9525 to 2.54 cm).

The optional front (top) cover sheet 12 and/or the optional back (bottom) cover sheet 30 may be made from any suitable paper material having any suitable basis weight, woven or nonwoven glass fiber (fiberglass), woven or nonwoven mineral wool fiber, or woven or nonwoven other fibrous materials, or combination of fibrous materials.

When the back and front cover sheets are made of paper the paper materials for each cover sheet may be the same or different. Various paper grades can be used in gypsum panels, including Manila grade paper with a smooth calendared finish is often used as the facer paper cover sheet, and newsline paper with a rougher finish is often used as the backer paper cover sheet. Typically both paper grades are multi-ply with at least one liner ply and several filler plies. However, if desired, at least one paper cover sheet or both paper cover sheets may be made of single-ply paper. Newsline is similar to Manila, but it is thinner because of its lighter weight.

Optionally, the cover sheets may incorporate and may have added to their exposed surfaces, coatings of materials providing surfaces for specific construction applications such as exterior sheathing, roofing, tile backing, etc. Thus, they may be uncoated or, for example, coated with a polymer coating and/or a hydrophobic finish The gypsum core layer 24 may also include optional ingredients, for example, phosphate such as sodium trimetaphosphate, potassium trimetaphosphate, ammonium trimetaphosphate, lithium trimetaphosphate, or any combination thereof.

Gypsum and Stucco (Calcined Gypsum)

The calcium sulfate hemihydrate (typically provided in the raw material known as stucco or calcined gypsum) component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. In some aspects, the stucco may include non-gypsum minerals, such as minor amounts of clays or other components that are associated with the gypsum source or are added during the calcination, processing and/or delivery of the stucco to the mixer. Typically the raw gypsum has at least 60 wt. %, preferably at least 70 wt. %, more preferably at least 80 wt. %, typically at least 90 wt. % or typically at least 95 wt. % calcium sulfate dihydrate.

Urea

Urea used in the invention has the formula of $NH_2CONH_2$. It may be used in crystalline form or as an aqueous solution and is present in the gypsum board at 0.03-1 wt. %, preferably 0.05-0.8 wt. %, more preferably 0.06-0.6 wt. %, most preferably 0.05-0.2 wt. %, for example 0.01-0.02 wt. % or 0.01-0.05 wt. %. Urea does not include urea resins, urea formaldehyde or urea complexes.

The invention includes urea incorporated into the gypsum board. The gypsum board of the invention preferably has an absence of urea resins, urea formaldehyde and urea complexes. The gypsum board of the invention preferably has an absence of urea applied as a coating of the gypsum board.

Gypsum Board with a Skim Layer

In an embodiment the gypsum board of the invention is a composite gypsum board that comprises a gypsum core layer of the invention comprising set gypsum formed from at least water, stucco, and urea, as described above, and further optionally comprises a skim layer disposed in bonding relation to a first face of the gypsum core layer. If a first face of the gypsum core layer is also provided with a first cover sheet then the skim layer is between the first face of the gypsum core layer and the first cover sheet.

FIG. 2 shows a schematic cross-sectional view of an embodiment of the composite gypsum board 10 having the set gypsum core 24 comprising calcium sulfate dihydrate and urea according to the invention, and further including a skim layer 18 and the front (top) cover sheet 12 and the back (bottom) cover sheet 30. The materials of the cover sheets 12, 30 are as described above. The front (top) cover sheet 12 has a first face 14 and a second face 16. The optional skim layer 18 is in bonding relation to front (top) cover sheet 12. The skim layer 18 has a first face 20 and a second face 22. The board core 24 has a first face 26 and a second face 28. The back (bottom) cover sheet 30 has a first face 32 and a second face 34.

FIG. 2 shows the composite gypsum board 10 is arranged such that face 16 of the front (top) cover sheet 12 faces the first face 20 of the skim layer 18 and the second face 22 of the skim layer 18 faces the first face 26 of the core 24. The second face 28 of the core 24 faces the first face 32 of the back cover sheet 30.

Typically, the skim layer 18 has the same composition as the core layer 24. Thus, typically the skim layer has at least 60 wt. % calcium sulfate dihydrate, preferably at least 70 wt. %, and more preferably at least 80 wt. %, typically at least 90 wt. % or at least 95 wt. % calcium sulfate dihydrate, and 0.03-1 wt. %, preferably 0.05-0.8 wt. %, more preferably 0.06-0.6 wt. %, most preferably 0.05-0.2 wt. %, for example 0.01-0.02 wt. % or 0.01-0.05 wt. %, urea distributed uniformly throughout the skim layer. Typically, the skim layer has a density of at least about 1.1 times higher than a density of the gypsum core layer. The board has an overall thickness "T" of about ⅜ inch to about 1 inch (0.9525 cm to 2.54 cm). The gypsum core layer 24 may have a thickness "T2" of about ⅜ inch to about 1 inch minus the thicknesses of any skim layer and/or cover sheet, for example "T2" of about ⅔ inch to about ⅞ inch (0.635 cm to 1.2225 cm), if one or more skim layers and/or cover sheets are present. The thickness "T2" of the gypsum core layer 24 is greater than the thickness "T1" of the skim layer 18. Typically, the skim layer has a thickness ("T1") of from about 0.02 inches (about 0.05 cm) to about 0.2 inches (about 0.5 cm). Optionally a second skim layer (not shown), of the same or different composition, and the same or different thickness, as the first skim layer 18, may be applied to the second face 28 of the core 24. If the back (bottom) cover sheet 30 is present then the second skim layer is between the second face 28 of the core 24 and the back (bottom) cover sheet 30.

Another option is to have no first skim layer 18 but have a skim layer (not shown), of the same or different composition, and the same or different thickness, as described above for the first skim layer 18, that may be applied to the second face 28 of the core 24. If the back (bottom) cover sheet 30 is present then this skim layer is between the second face 28 of the core 24 and the back (bottom) cover sheet 30.

The higher density gypsum layer (or skim layer) may be formed at or about the first cover sheet and/or along the peripheral edges of the cover sheet. The higher density layer typically provides beneficial properties to the board surfaces, such as increased hardness improved nail pull strength etc. The higher density along the peripheral edges of the cover sheet typically provides improved edge hardness and other beneficial properties. In yet other embodiments, a higher density layer is applied to either or both cover sheets, or to the equivalent portions of the core/cover sheet construction.

Optionally, the core layer and/or skim layer includes an enhancing additive. The optional enhancing additive includes a strength-imparting additive, such as pregelatinized starches, boric acid, nano-cellulose, micro-cellulose, or any combination thereof, that helps produce desired strength properties. The core layer 24 and skim layer 18 may also include phosphate such as sodium trimetaphosphate, potassium trimetaphosphate, ammonium trimetaphosphate, lithium trimetaphosphate, or any combination thereof Siloxanes In some embodiments, the water resistance (moisture resistance) of gypsum boards formed according to the principles of the present disclosure can be improved by adding a polymerizable siloxane, typically in the form of a stable emulsion, to the slurry used to make the gypsum boards. Thus, the present invention also relates to making the gypsum boards 10 as moisture resistant gypsum based boards, for example, exterior sheathing, roofing, tile backer board, gypsum wall boards, or reinforced gypsum composite boards. The moisture resistant board has a gypsum core layer (such as gypsum core layer 24 of FIG. 1) comprising calcium sulfate dihydrate and urea according to the invention. Preferably a catalyst which promotes the polymerization of the siloxane is also added to the aqueous gypsum slurry. For example, the aqueous gypsum slurry to make the gypsum core may include 0.4-1.0 wt. % siloxane and optionally 0.1-0.5 wt. % of a magnesium oxide catalyst, preferably dead burned magnesium oxide catalyst or blends of dead burned magnesium oxide and fly ash catalyst to enhance the polymerization of the siloxane to form a highly cross-linked silicone resin. Siloxane and dead burned magnesium oxide catalyst are disclosed in U.S. Pat. No. 7,892,472 to Veeramasuneni et al, which is incorporated herein by reference. The aqueous gypsum slurry is then shaped and dried under conditions which promote the polymerization of the siloxane to form a highly cross-linked silicone resin. Such moisture resistant boards may absorb less than 10% of its own weight in water when immersed at 70° F. for two hours in accordance with ASTM Standard 1396 within 24 hours.

In some embodiments, embodiments of the core slurry formulation for use in preparing gypsum boards in accordance with principles of the present disclosure can comprise a combination of pre-gelatinized starch (or functionally equivalent starch) in an amount greater than about 2 by wt. % based on the weight of stucco and siloxane in an amount of at least 0.4% based on the weight of the stucco, which can produce gypsum panels with less than about 5% water absorption.

Expansion Particles

In some embodiments, the fire resistance of gypsum boards formed according to the principles of the present disclosure can be improved by adding expansion particles, such as vermiculite to the aqueous slurry used to make the gypsum boards. Such fire resistant gypsum based board, also known as fire rated board, has a gypsum core layer (such as gypsum core layer 24 of FIG. 1) comprising calcium sulfate dihydrate and urea according to the invention disposed between two cover sheets plus the expansion particles in the core. The gypsum core of the fire rated gypsum panels comprises a crystalline matrix of set gypsum and high expansion particles, such as high expansion vermiculite, expandable at least about 200%, preferably at least about 300% or more, of their original volume after being heated for about one hour at about 1560° F. (about 850° C.). Typically the gypsum core 24 comprises about 5 to about 10 wt. % high expansion particles, preferably high expansion vermiculite.

The high expansion particles are distributed throughout the gypsum core 24 in amounts effective to provide fire resistance in terms of shrinkage resistance comparable to commercial Type X gypsum panels and other much heavier and denser gypsum panels. Such high expansion particles are disclosed in U.S. Pat. No. 8,323,785 to Yu et al, which is incorporated herein by reference.

The gypsum core layer can have a density (D) of about 40 pounds per cubic foot or less and a core hardness of at least about 11 pounds (5 kg). The gypsum core can be effective to provide a Thermal Insulation Index (TI) of about 20 minutes or greater, for example greater than 30 minutes.

Preferably the gypsum core layer is effective to provide the panel with a ratio of TI/D of about 0.6 minutes/pounds per cubic foot (0.038 minutes/(kg/m$^3$)) or more, wherein D is density of the gypsum core and TI is Thermal Insulation Index. Preferably the panel satisfies the at least one hour fire-rated panel standards in assemblies UL U305 and/or UL U419. Preferably the gypsum core layer and the high expansion particles are effective to provide the panel with a High Temperature Shrinkage (S) of about 10% or less.

The fire resistant board optionally has a higher density gypsum layer (skim layer) formed at or about the first cover sheet or peripheral edges thereof and/or the second cover sheet or peripheral edges thereof. In some embodiments the higher density layer comprise about 3% to about 4% of the board weight.

Typical methods for making fire resistant gypsum boards are described in U.S. Pat. No. 8,323,785 to Yu et al. herein incorporated by reference.

As mentioned in U.S. Pat. No. 8,323,785 to Yu et al, Example 4B, a test for measuring "High Temperature Shrinkage" (S) was developed and reported in ASTM Pub. WK25392, to provide a quantitative measure of the shrinkage characteristics of gypsum panels under high temperature conditions. This test procedure reflects the fact that the High Temperature Shrinkage that gypsum panels may experience under fire conditions is influenced by factors in addition to calcining reactions that may occur in the panel gypsum cores under high temperature conditions. The test protocol, accordingly, uses an unvented furnace so that there is no airflow from outside of the furnace that might cool the test specimens. The furnace temperature also is about 1560° F. (850° C.) to account for the shrinkage that may occur in the anhydrite phases of the gypsum core structures, as well as calcining and other high temperature effects, when exposed to the high temperatures fire conditions. The test specimens are about 4 inches (100 mm) diameter disks cut from gypsum board samples using a drill press with a hole saw blade. Six specimens are typically employed for each test. The specimens are placed in the furnace side by side without touching each other, Test specimens were placed on small pedestals to allow them to heat and vent uniformly on both faces so that they remained relatively flat, cylindrical disks.

In order to prevent thermal shock to the test specimens, which might produce invalid test results due to spalling and breakage, the test protocol was modified to place the test specimens in the furnace before it was heated to about 1560° F. (850° C.). The specimens were held at that temperature for a minimum of about 20 minutes before the furnace was shut off. The furnace door remained closed while the furnace cooled. The specimens were not removed for measurement until after the temperature had dropped to near room temperature.

As gypsum board is anisotropic, the amount of shrinkage will vary slightly in the length and width directions. Therefore, two orthogonal measurements were taken and averaged to compute the mean diameter of the disk. In these tests, two measurements at 90 degrees to each other were taken as it has been found that this approach provides a consistent mean diameter measurement from specimen to specimen. It has been found that the orientation of the specimens in terms of "machine direction" and "cross machine direction" is not a significant concern for the purposes of this test. Typically, if the two measurements for a disk differed by more than 0.01 inches (0.25 mm), then the disk was rejected and the measurements excluded from the reported results. High Temperature Shrinkage was calculated as the percent change in mean diameter after heat exposure, and denoted "S," typically to the nearest 0.1% for the group of six test specimens.

The amount of x, y (width, height) High Temperature Shrinkage is calculated as the percent change in mean diameter after heat exposure, and denoted "S". "High Temperature Shrinkage" as used herein refers to a measure of the shrinkage characteristics of gypsum panels under high temperature testing and sample conditions consistent with those described in ASTM Pub. WK25392 and U.S. Pat. No. 8,323,785 to Yu et al, Example 4B. ASTM Pub. WK25392 is incorporated herein.

The expansion particles can have a first unexpanded phase and a second expanded phase when heated. This can provide fire performance. Such industry standard fire tests include, without limitation, those set forth in the procedures and specifications of UL U305, U419 and U423 full scale fire tests and fire tests that are equivalent to those. In other embodiments, reduced weight and density gypsum panels formed according to principles of the present disclosure, and the methods for making same, can provide a shrink resistance of greater than about 85% in the x-y directions at temperatures of in excess of about 1800° F. (980° C.).

An embodiment of the fire rated board of the invention has a set gypsum core layer that has a density of from about 30 pounds per cubic foot (pcf) to about 40 pcf, and comprises set gypsum in an amount from about 1150 lbs/msf to about 1600 lbs/msf, wherein the lbs/msf values are for a ⅝ inch (1.59 cm) thick gypsum board and subject to proportional adjustment for thicker or thinner gypsum core layers, wherein the set gypsum comprises calcium sulfate dihydrate, and wherein the set gypsum core layer comprises:

at least 60 wt. % said calcium sulfate dihydrate, preferably at least 70 wt. %, and more preferably at least 80 wt. %, typically at least 90 wt. % or at least 95 wt. % calcium sulfate dihydrate, 0.03-1 wt. %, preferably 0.05-0.8 wt. %, more preferably 0.06-0.6 wt. %, most preferably 0.05-0.2 wt. %, for example 0.01-0.02 wt. % or 0.01-0.05 wt. %, urea, about 2 to about 10 wt. %, for example about 2 to about 5 wt. %, high expansion vermiculite having a volume expansion of about 200% or more of their original volume after being heated for about one hour at about 1560° F., and 0.1 to about 1.0 wt. %, for example about 0.1 to about 0.3 wt. % or about 0.3 to about 0.9 wt. % glass fiber, or 0.5 to about 10 wt. %, for example about 0.8 to about 3.0 wt % or about 1.0 to about 2.0 wt. % mineral wool, and 0 to about 3 wt. %, for example about 0.3 to about 3 wt. %, starch, and 0 to about 0.4 wt. %, for example about 0.03 to about 0.4 wt. % or about 0.10 to about 0.15 wt. %, phosphate, 0 to about 1.0 wt. %, for example about 0.1 to about 1.0 wt. % dispersant.

Preferably the set gypsum core layer is effective to provide a Thermal Insulation Index (TI) of about 20 minutes or greater, for example greater than 30 minutes.

Preferably the set gypsum core layer is effective to provide a High Temperature Shrinkage (S) of about 10% or less.

Assemblies made using the ⅝ inch (1.59 cm) thick fire rated gypsum panels formed of the present disclosure can provide fire resistance when tested in assemblies UL U305, U419 and U423 in accordance with the fire test procedures of ASTM E119-20. The fire resistance of fire rated gypsum panels of the present disclosure can be reflected by the maximum single sensor temperature or the average sensor temperature on the unexposed surface of such assemblies made pursuant to such fire test procedures (and equivalent fire test procedures). Assemblies made using panels formed according to principles of the present disclosure and tested in assemblies UL U419 may provide:

a maximum single sensor temperature of less than about 500° F. (260° C.) and/or an average sensor temperature of less than about 380° F. (195° C.) at about 60 minutes elapsed time;

a maximum single sensor temperature of less than about 260° F. and/or an average sensor temperature of less than about 250° F. at about 50 minutes elapsed time; a maximum single sensor temperature of less than about 410° F. and/or an average sensor temperature of less than about 320° F. at about 55 minutes;

a maximum single sensor temperature of less than about 300° F. and/or an average sensor temperature of less than about 280° F. at about 55 minutes elapsed time' and/or a maximum single sensor temperature of less than about 415° F. and/or an average sensor temperature of less than about 320° F. at about 60 minutes elapsed time.

In certain of such embodiments, gypsum panels formed according to principles of the present disclosure can have a core with a density of less than about 40 pcf that satisfies the requirements for a 60 minute fire rated gypsum panel under one or more of the UL U305, U419 and U423 assemblies tested in accordance with ASTM E119-20 and other fire test procedures that are equivalent to any one of those.

The high expansion particulates are typically in the form of vermiculite with a high volume of expansion relative to conventional, relatively low expansion vermiculite, such as that referred to as "Grade No. 5" unexpanded vermiculite (U.S. grading system) (with a typical particle size of less than about 0.0157 inches (0.40 mm)) and other low expansion vermiculites which have been used in commercial fire rated gypsum panels.

The vermiculites also referred to herein have a volume expansion after heating for one hour at about 1560° F. (about 850° C.) of about 200% or more, preferably about 300% or more, of their original volume. For example, Grade No. 5 unexpanded vermiculite typically has a volume expansion at about 1560° F. (about 850° C.) of about 225%. Other particulates with properties comparable to high expansion vermiculite also may be utilized in embodiments of panels formed according to principles of the present disclosure, as well. In some embodiments, high expansion vermiculites can be used that have a volume expansion of about 300% to about 380% of their original volume after being placed for one hour in a chamber having a temperature of about 1560° F. (about 850° C.).

Another suitable vermiculite is often referred to as Grade No. 4 unexpanded vermiculite (U.S. grading system) (such high expansion vermiculites were rejected as a useful ingredient in fire rated gypsum wallboard in U.S. Pat. No. 3,454,456 discussed above). In some embodiments, at least about 50% of the particles in the high expansion vermiculite used in panels formed according to principles of the present disclosure will be larger than about 50 mesh (i.e. greater than about 0.0117 inch (0.297 mm) openings). In other embodiments, at least about 70% of the particles will be larger than about 70 mesh (i.e. larger than about 0.0083 inch (0.210 mm) openings).

In other embodiments, vermiculites can be used that are classified under different and/or foreign grading systems. Such vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used.

TABLE 1 lists typical particle distributions A, B or C suitable for high expansion vermiculite in embodiments of the present invention.

TABLE 1

| (all % are wt. %) | | | |
|---|---|---|---|
| Particle Size | A | B | C |
| less than about 500 micrometers | up to about 50% | between about 25% and about 45% | between about 5% and about 20% |
| between about 500 and about 1000 | up to about 60% | about 40% to 60% | about 35% to about 60% |
| between about 1000 and about 1500 micrometers | up to about 40% | up to about 20% | about 20% to about 40% |
| between about 1500 and about 3000 micrometers | up to about 20% | up to about 10% | up to about 20% |

Systems

It will be understood that gypsum boards in accordance with some embodiments can be constructed and used in an assembly as will be understood in the art. Generally, as will be understood, the composite boards can be affixed in any suitable arrangement to studs formed of any suitable material such as wood, metal or the like. The top or face cover sheet of the board faces out and is generally decorated (e.g., with paint, texture, wallpaper, tile, etc.) in use while the bottom or back cover sheet faces the studs. A cavity is normally present behind the stud, facing the back paper, in use. If desired, insulation material as known in the art optionally can be placed in the cavity. In one embodiment, the assembly comprises two composite boards connected by studs with a cavity there between, facing the bottom cover sheets of the respective boards.

FIG. 3 is a perspective view of a typical wall system 40 that may employed gypsum wallboard made from the treated gypsum. FIG. 3 shows the gypsum board 10 of the present invention attached to one side of a metal stud wall with a metal stud wall "skeleton" 42 which includes a plurality of metal studs 43, an upper track 44, and a lower track 45. The gypsum board 10 may be secured in any known manner to one or both sides of the metal studs 43 to close the wall and form the wall surface. A typical metal stud wall "skeleton" may be fabricated according to U.S. Pat. No. 6,694,695 to Collins et al., incorporated herein by reference, which is suitable for combination with an exterior sheathing panel to achieve an exterior wall system of the present invention. This metal stud wall "skeleton" system is merely provided as illustrative as other framing systems may also be employed, such as wood framing.

In the system the gypsum panels are typically attached to the framing by any one or more of screws, nails, or glue. Also, in the system the gypsum panel typically has no perforations except for perforations made by the screws or nails.

Methods for Manufacturing Gypsum Board

Various methods can be employed for preparing a gypsum board of the present invention from an aqueous gypsum slurry comprising calcium sulfate hemihydrate and urea.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

The present invention covers methods making a gypsum board, comprising:

preparing an aqueous slurry comprising a mixture of water, stucco, and urea, wherein the stucco comprises calcium sulfate hemihydrate, wherein the aqueous slurry comprises a mixture of:

at least 60 wt. %, preferably at least 70 wt. %, more preferably at least 80 wt. %, typically at least 90 wt. % or typically at least 95 wt. % said calcium sulfate hemihydrate on a dry (water free) basis, 0.03-1 wt. %, preferably 0.05-0.8 wt. %, more preferably 0.06-0.6 wt. %, most preferably 0.05-0.2 wt. %, for example 0.1-0.2 wt. % or 0.1-0.5 wt. %, said urea on a dry (water free) basis, and the water at a weight ratio of water to the calcium sulfate hemihydrate of 0.2:1 to 1.2:1; and disposing a layer of the aqueous slurry on a surface and setting the calcium sulfate hemihydrate to form a set gypsum core layer comprising calcium sulfate dihydrate and the urea distributed uniformly throughout the set gypsum core layer; and cutting the set gypsum core layer into a gypsum board of pre-determined dimensions; and drying the gypsum board;

wherein the set gypsum core layer has a density (D) of about 40 pounds per cubic foot or less, and the set gypsum core layer has a mass of pounds per area less than 2100 lbs/msf, wherein the lbs/msf values are for a ⅝ inch (1.59 cm) thick panel and subject to proportional adjustment for thicker or thinner panels.

Preferably the set gypsum core layer is effective to provide a Thermal Insulation Index (TI) of about 20 minutes or greater, for example 30 minutes or greater.

Preferably the set gypsum core layer is effective to provide a High Temperature Shrinkage (S) of about 10% or less.

The present invention encompasses methods for making a gypsum board, comprising:

preparing an aqueous slurry comprising a mixture of water and stucco, wherein the stucco comprises calcium sulfate hemihydrate, and the aqueous slurry comprises a mixture of:

at least 60 weight percent said calcium sulfate hemihydrate on a dry basis, 0.03-1 weight percent urea on a dry basis, optionally about 500 ppm to about 3000 ppm chloride anions of per 1,000,000 parts by weight (pbw) said calcium sulfate hemihydrate, and the water at a weight ratio of water to the calcium sulfate hemihydrate of 0.2:1 to 1.2:1; and disposing the aqueous slurry between a front paper cover sheet and a back paper cover sheet, each paper cover sheet having an inner surface and an outer surface, and the aqueous slurry contacts the inner surfaces of the front paper cover sheet and the back paper cover sheet;

setting the calcium sulfate hemihydrate to form a panel comprising a board core layer comprising calcium sulfate dihydrate; and drying the panel and cutting the panel into a gypsum board having one or more pre-determined dimensions.

The present invention encompasses a gypsum core layer that has at least one of a thermal sag of less than 1 inch as measured according to the thermal sag test in examples of the present specification, a density of about 40 pounds per cubic foot or less, and a mass of pounds per area less than 2100 lbs/msf, wherein the mass of pounds per area lbs/msf values are for a ⅝ inch (1.59 cm) thick board and subject to proportional adjustment for thicker or thinner boards.

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. Briefly, such processes may optionally involve discharging a cover sheet onto a moving conveyor. Since gypsum board is normally formed "face down," this cover sheet corresponds to facer cover sheet 12 upon completion of the fabrication process. The gypsum slurry can be made with any suitable water/calcium sulfate hemihydrate ratio for disposition onto the cover sheet.

Figure 5:
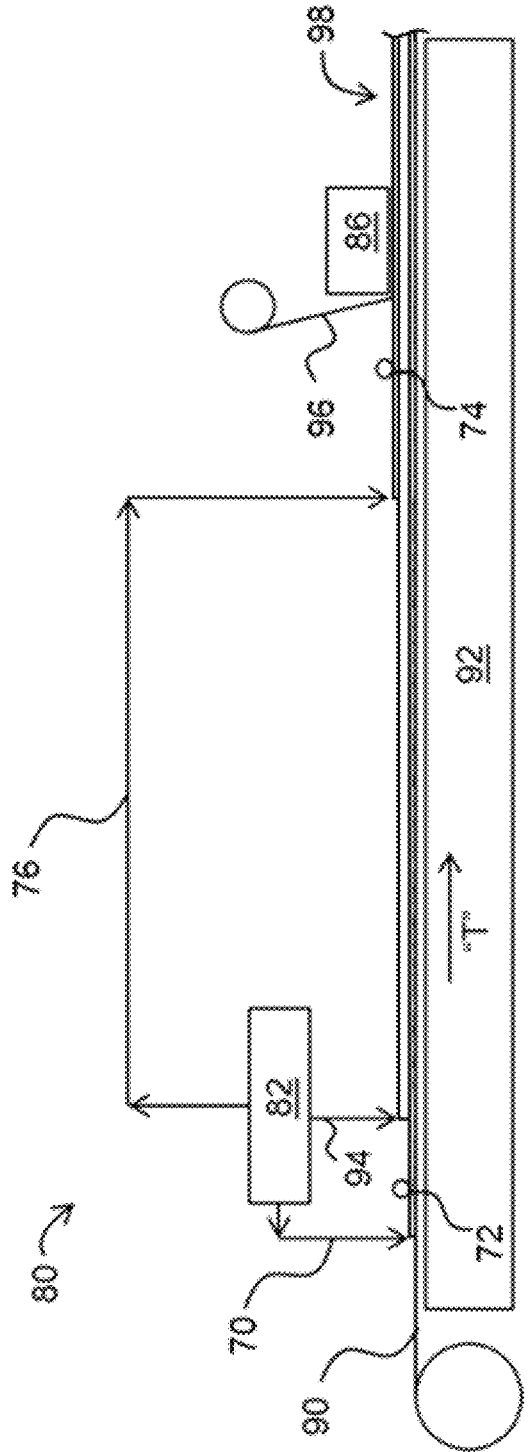
FIG. 5 shows a process flow diagram of the present method.

FIG. 5 illustrates an example of a wet end 80 (upstream portion) of a manufacturing production line for producing a layered gypsum board of the present invention having a gypsum layer optionally between two cover sheets. The cover sheets are, for example, made of paper, for example manila paper or kraft paper, non-woven glass scrims, woven glass mats, other synthetic fiber mats such as polyester, metallic foil such as aluminum, and the like, and combinations thereof.

The wet end 80 includes a gypsum slurry mixing and dispensing assembly 82 and a forming station 86. A first moving and web 90 of first cover sheet material which moves in a longitudinal direction of travel "T" along the forming table 92. The gypsum core slurry 94 is mixed in the gypsum slurry mixing and dispensing assembly 82 where additives and optional foaming of the slurry occurs. While the gypsum slurry mixing and dispensing assembly 82 is illustrated as a single component of the wet end 80, there can be multiple components that comprise the gypsum slurry mixing and dispensing assembly 82.

A first gypsum skim layer slurry 70 may be applied to the first cover sheet material 90 to form a gypsum skim layer on the first cover sheet material 90, and passes under a first gypsum skim coat roller 72, before depositing the gypsum core slurry 94. The gypsum skim layer is relatively denser than the gypsum core slurry which may be a foamed gypsum slurry. As is known in the art, the skim layer can be achieved by directing a portion of the slurry out of the mixer and into a skim layer mixer prior to introduction of foam or by beating foam out of the slurry. Thus, the gypsum core slurry 94 for the gypsum core layer of the board is deposited onto either the first moving web 90 (e.g., to form the gypsum core) or the gypsum skim layer slurry 70, if applied. In a preferred embodiment of the invention, such as for gypsum wallboard or acoustical panel production, including but not limited to ceiling tile, wall panel, and partitions for office cubicles, the slurry for forming the core of the board is deposited onto a densified layer (i.e., a skim coat layer) of aqueous slurry carried by the backing layer, as described, for example, in U.S. Pat. Nos. 4,327,146 and 5,718,797, each of which is incorporated by reference herein.

As is also known in the art, a second skim layer can optionally be applied on top of the core slurry, particularly in embodiments where a cover layer is employed such as with gypsum drywall. The skim layer(s) can have any suitable thickness, such as, for example, from about 0.0625 inch to about 0.125 inch.

A second moving web 96 of cover sheet material (namely the material for the above-described rear facing 6 which may be uncoated or coated with a pre-applied polymer coating and a hydrophobic finish) is applied to the gypsum slurry 94, or applied to the second skim lay slurry 76 if present as described below, and passed through the forming station 86 to compress the layers into a desired total thickness (e.g., about 0.25 inches to about 1.0 inches thick, preferably 0.25 inches to about 0.625 inches thick). The resultant structure is a gypsum board preform 98.

Typically the outer surface of the applied moving web 96 is in contact with no additional layers.

Additional components can be included in the wet end 80 of the manufacturing line. For example, a calcined gypsum slurry 76 for forming a second skim layer may be applied to the layer of deposited gypsum core slurry 94, and then passes under a second gypsum skim coat roller 74. The first and second gypsum skim layers will typically be thinner and denser than the gypsum core layer. Typically the calcined gypsum (calcium sulfate hemihydrate) slurry for the gypsum core layer is foamed to be less dense than the slurry 70 of the first skim layer, as well as less dense than the slurry 76 of the second skim layer. Thus if desired, calcined gypsum core slurry stream 94 may pass through a former device (not shown), which for instance mixes the calcined gypsum core slurry stream 94 with foam and/or air, prior to deposition on the first coated nonwoven glass fiber cover sheet material 90. Typically the slurry streams for the gypsum skim layers 70, 76 have the same composition and density. However if desired, the slurry streams for the gypsum skim layers 70, 76 can have different compositions and/or densities. FIG. 5 shows both gypsum slurries 70, 76, 94 coming from the same calcined gypsum slurry mixing and dispensing assembly 82. However, the calcined gypsum slurries 70, 76, 94 can come from different mixing and dispensing assemblies to have different properties, such as different densities.

The first gypsum skim coat roller 72, the second gypsum skim coat roller 74, the forming table 92, the forming station 86 can all comprise conventional equipment suitable for their intended purposes as is known in the art. The wet end 80 can be equipped with other conventional equipment as is known in the art.

The calcined gypsum in the gypsum slurries 70, 76, 94 reacts with the water and sets as a conveyor moves the gypsum board preform 98 down a manufacturing line. The gypsum board preform 98 is dried and cut into segments of predetermined dimensions at a point along the line where the gypsum board preform 98 has set sufficiently. The segments can be dried (e.g., in a kiln) to drive off excess water, and processed to provide the final layered wallboard of desired dimensions.

The gypsum layer (including the core and skim layers) resulting from the set gypsum core slurries 70, 76, 94 generally has a thickness of 0.25 inches to 1.0 inches and an overall density of 40 pounds/cubic foot or less. When foamed, the portion of the gypsum core layer resulting from the set foamed gypsum slurry has a total void volume of 30 to 90 volume percent, preferably a void volume of 45 to 80 volume percent. The first skim layer and second skim layer (if present) resulting from setting the gypsum slurries 70, 76 have a total void volume of less than 30 volume percent, preferably less than 10 volume %.

The forming station is the location in the board line where wet board precursor is sized to a pre-determined width and thickness, and optionally, length. Thus, the forming station includes, or can be, any device capable of performing a final mechanical spreading and/or shaping of the slurry across the width of the backing layer, many of which are known in the art. The forming station comprises a means of conforming the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystalliza-tion (i.e., setting) and drying of the slurry. Typically, the desired slurry thickness is substantially equal to the desired board thickness (e.g., about 0.375", about 0.5", about 0.625", about 0.75", or about 1"). By way of illustration only, the final board thickness typically is within about +−⅛" or less of the final slurry thickness.

The forming station includes any device that is capable of creating the desired slurry thickness and width of the wet board precursor. Suitable devices include, for example, a forming plate, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

In an embodiment, to produce gypsum board having front and back paper cover sheets, the stucco is mixed with water and additives to form an aqueous slurry which is continu-ously fed between continuous layers of paper on a board machine. As the board moves down a conveyer line to form a panel, the calcium sulfate recrystallizes or rehydrates, reverting to its original rock state. The paper becomes bonded to the board core layer as the gypsum sets. The panel is then cut to length and conveyed through dryers to remove any free moisture.

Dry and/or wet components of the gypsum slurry are fed to a mixer, where they are agitated to form the gypsum slurry. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit may include a slurry distributor with either a single feed inlet or multiple feed inlets, such as those described in U.S. Patent Applica-tion Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge con-duit after all ingredients have been added, including foaming agent, is the primary gypsum slurry and is used to form the board core layer. This gypsum slurry is discharged onto the moving cover sheet.

In some embodiments, the aqueous slurry optionally has foam added to decrease the product density. Foam is typi-cally generated by combining soap and water. The foam may be injected into the aqueous slurry as it exits the mixer through a gate, hose or chute or shortly afterwards, as is known in the art. Foam is typically added to the portion of slurry for the less dense core layer, but not for the portion of slurry for the skim coat.

When the foam and the slurry have been brought together, the resulting slurry moves toward and is poured onto a conveyor lined with a first piece of facing material which is typically the front cover sheet (e.g., facer paper cover sheet 12). Another piece of facing material which is the back cover sheet (e.g., backer paper cover sheet 30) is placed on top of the slurry, forming a sandwich assembly with the slurry between the two facing materials. The sandwich assembly is fed to a forming plate, the height of which determines the thickness of the board. Next the continuous sandwich assembly is cut into appropriate lengths at a cutting knife, usually eight feet to twelve feet. During this processing the slurry is allowed to harden (set) to form a board core comprising an interlocking crystalline matrix of set gypsum.

The boards are then moved to a kiln for drying. Tempera-tures in the kiln typically range from 450° F. to 500° F. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

As described above, one or both of the cover sheets in a gypsum board may optionally be in interfacial contact with a high-density region or layer of the board core layer, also known as a skim coat. The skim coat may be contiguous with the board core layer after setting. Where foam is inserted into the discharge conduit, a stream of secondary gypsum slurry can be removed from the mixer body before foaming to provide a slurry for forming the skim coat. If present, the skim coat may be deposited onto the moving front cover sheet before the main portion of the gypsum slurry is deposited for forming the board core layer, with deposition of the skim coat usually occurring upstream of the mixer. After being discharged from the discharge con-duit, the gypsum slurry is spread, as necessary, over the front cover sheet (optionally bearing a skim coat). At this point, the spread gypsum slurry is contacted with a second cover sheet, which may correspond to the back cover sheet. The resulting wet assembly is in the form of a sandwich assembly, which is a precursor to the final gypsum board product. The back cover sheet may optionally bear a second skim coat, which can be formed from the same or different secondary gypsum slurry as for the skim coat on the front cover sheet, if present.

The gypsum core (e.g., gypsum core 24 of FIG. 1) resulting from the set gypsum core slurry generally has a thickness of about 0.25 inches to about 1.0, typically about 0.375 inches to about 1.0 inches and a density of 15 to 40 pounds/cubic foot. When foamed, the gypsum core resulting from the set foamed gypsum slurry has a total void volume of 10 to 92 volume percent, particularly 25 to 90 volume percent, and more particularly 30 to 85 volume percent. In contrast, the resulting skim layer, if present, has a total void volume of less than 30 volume percent.

Optional Additives

Other additives that may be present in the gypsum slurry used to form the board core layer include, but are not limited to, strengthening agents, foam (prepared from a suitable foaming agent), dispersants, polyphosphates (e.g., sodium trimetaphosphate), retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, starches, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum core slurry and/or the skim layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum core slurry and/or the skim layer slurry in amounts on a dry basis per 100 pbw (pbw=parts by weight) of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815, 049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}PnO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalene sulfonates) and derivatives, which are condensation products of naphthalene sulfonic acids and formaldehyde, as well as polycarboxylate dispersants, such as polycarboxylic ethers, for example. Other examples of suitable dispersants include ligno-sulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalene sulfonates are a naphthalene sulfonate solution in water, having a range of about 35% to about 55% by weight naphthalene sulfonate solids content. However, if desired the naphthalene sulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalene sulfonates, polycarboxylic ethers or lignosulfonates.

Accelerators and/or retarders may be added to the gypsum core slurry and/or the skim layer slurry to modify the rate at which the calcium sulfate hemihydrate hydration reactions take place. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum core slurry and/or the skim layer slurry (preferably the gypsum core slurry) in amounts that provide the above mentioned reduced core density and panel weight. The foaming agent to produce the foam is typically a soap or other suitable surfactant. The introduction of foam in the gypsum core slurry in the proper amounts, formulations, and process will produce a desired network and distribution of voids within the core of the final dried wallboards. This void structure permits the reduction of the gypsum and other core constituents and the core density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum core, as described in U.S. Pat. Nos. 5,643,510; 6,342,284; and 6,632,550, which are incorporated herein by reference in their entirety. The approaches for adding foam to a gypsum core slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles as discussed above (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like. If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight. There may also be an absence of any one or more of these components for fire and/or water resistance. For example, there may be an absence of siloxane.

The starch, when present, can be a pre-gelatinized (cooked) starch and/or an uncooked starch. In this regard, starches are classified as carbohydrates and contain two types of polysaccharides: linear amylose and branched amylopectin. Starch granules are semi-crystalline, e.g., as seen under polarized light, and are insoluble in water at room temperature or near room temperature. Uncooked starches are characterized as being cold water insoluble and having a semi-crystalline structure. Typically, uncooked starches are obtained by wet milling and are not modified by heating wet starch as in the case of cooked starches. Pre-gelatinized, or cooked, starches are characterized as being cold water soluble and having a non-crystalline structure. There may also be an absence of starch.

Water

Water is added to the slurry in any amount that makes the slurry flowable. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum core slurry and/or the skim layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1, typically about 0.6 to about 1.2, or about 0.8 to about 1.0, or about 0.85:1.

The following examples further illustrate the invention but, of course, should not be construed as in any way limiting its scope.

EXAMPLES

Thermal Sag Test and Shrinkage Test

Figure 6:
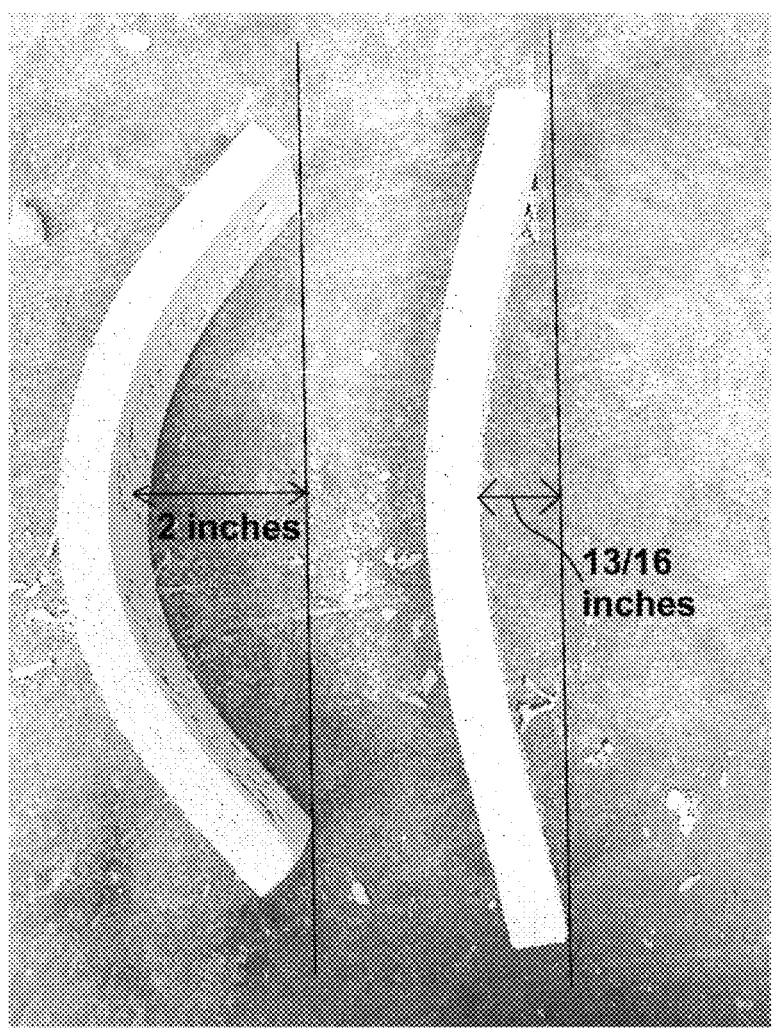
FIG. 6 shows a photograph of a sample with a 2 inch thermal sag and another sample with a ¹³⁄₁₆ inch thermal sag.

Samples were produced and a thermal sag test was conducted on the samples. For all of the examples, this thermal sag test procedure was used. 10"×1.5"×⅝" strips were cut from the cast boards. The samples were placed horizontally in a furnace on bricks (2.5" high) spaced 8" apart in the middle of the heated space. The furnace was heated from ambient temperature to 1600° F. (870° C.) (taking about 75 min), and then maintained at 1600° F. (870° C.) for 15 mins. The total heating time was 90 minutes. Sag performance was observed every 30 minutes after 30 minutes of heating. Thermal sag is the distance the sample dips from its original height due to exposure to fire during the test. Thus, it is the difference between the gap before exposure to the fire and the gap from original height after the fire testing. As the board is flat before the fire, the initial gap is zero. The maximum dip (distance) after the fire is the gap after the fire. A High-Temperature Thermal Sag of 2 inches means that the 10"×1.5"×⅝" strip test sample placed horizontally in a furnace on bricks (2.5" high) spaced 8" apart in the middle of the heated space dipped 2 inches at the center of the strip. For example, FIG. 6 shows a photograph of a sample with a 2 inch thermal sag and another sample with a ¹³⁄₁₆ inch thermal sag.

In this invention, the thermal sag (as measured according to the above-described thermal sag test) observed in gypsum boards with urea is 10-80%, preferably 15-70%, more preferably 20-60%, most preferably 30%, of the thermal sag observed in control boards (the same gypsum board composition without the urea).

Shrinkage in the examples of the present specification was tested according to the test described above for measuring "High Temperature Shrinkage" (S) of ASTM Pub. WK25392 as described above. Thus, shrinkage was tested at about 1560° F. (850° C.) on six test specimens that were about 4 inches (100 mm) diameter disks cut from gypsum board samples using a drill press with a hole saw blade as specified above. As specified above, in order to prevent thermal shock to the test specimens, which might produce invalid test results due to spalling and breakage, the test protocol was modified to place the test specimens in the furnace before it was heated to about 1560° F. (850° C.). The specimens were held at that temperature for a minimum of about 20 minutes before the furnace was shut off. The furnace door remained closed while the furnace cooled. The specimens were not removed for measurement until after the temperature had dropped to near room temperature.

Example 1: GF-Added Type X Board with and without Urea

Urea can be introduced to the slurry as a dry form or an aqueous solution. The dry powders soaked in the liquid solution for 10 seconds and blended for 10 seconds in a Hobart mixer, followed by injecting the foam for 13 or 7 seconds and mixing another 2 seconds. The slurry was poured into the 12"×13"×⅝" envelope.

After the slurry was set and hardened, the board dried at 450° F. for 15 mins, then dried at 360° F. for another 15 mins. At last, the board dried at 110° F. overnight.

Table 2 is the formula for making ultralight gypsum glass fiber ("GF") board with and without urea.

TABLE 2

| Sample ID | GF | GF-Urea |
|---|---|---|
| Thickness (inches) | ⅝" (1.5875 cm) | ⅝" |
| Stucco (g) | 900 | 900 |
| Accelerator (g) | 9 | 9 |
| Pregelatinized, partially hydrolyzed starch (g) | 5 | 5 |
| Glass Fiber (g) | 4.65 | 4.65 |
| Grade 4 Vermiculite (g) | 31 | 31 |
| Urea (g) | 0 | 0.9 |
| 10% STMP (g) | 3 | 3 |
| Retarder 1% (g) | 12 | 12 |
| Dispersant (g) | 3 | 3 |
| Water (g) | 855 | 855 |
| Air flow (L/min) | 40 | 40 |
| Soap flow (L/min) | 5 | 5 |
| Foam time (sec) | 15 | 15 |

Table 3 summarizes the thermal performance of the boards made from Table 2. The glass fiber board shows a similar thermal shrinkage as the glass fiber-urea board. However, the high-temperature sag of glass fiber-board is higher than that of Glass Fiber-Urea board, 2" vs. 1⁵⁄₁₆". The addition of urea improved the high-temperature sag resistance.

TABLE 3

Thermal performance of GF-Type X Board with and without Urea

| Sample | GF | GF-Urea |
|---|---|---|
| Thermal shrinkage X-Y % | 4.58 ± 0.41 | 4.67 ± 0.35 |
| Thermal Shrinkage Z % | 5.86 ± 0.47 | 5.38 ± 0.61 |
| High-Temperature Sag (inches) | 2" | 1⁵⁄₁₆" |
| Board Weight (lbs/msf) | 1820 | 1837 |

Example 2: Mineral Wool-Added Ultralight Board with and without Urea

For mineral wool (MW) added board, MW was added in the wet slurry form. 5% of MW slurry prepared by mixing MW with water in the Waring blender for 5 seconds. Urea was introduced as a dry form or an aqueous solution. Dry powders and the MW slurry were soaked in the solution for 10 seconds and blended for 10 seconds, followed by injecting the foam for 13 or 7 seconds and mixing another 2 seconds. The slurry was poured into the 12"×13"×⅝" envelope.

Table 4 is the formula for making MW-added ultralight board with and without urea.

TABLE 4 ultralight board formula with and without Urea

| Sample ID | MW | MW-Urea |
|---|---|---|
| Thickness (inches) | ⅝" (1.5875 cm) | ⅝" |
| Stucco (g) | 900 | 900 |
| Accelerator (g) | 9 | 9 |
| Pregelatinized, partially hydrolyzed starch (g) | 5 | 5 |

TABLE 4-continued

| ultralight board formula with and without Urea | | |
|---|---|---|
| Sample ID | MW | MW-Urea |
| Mineral Wool (g) | 11.2 | 11.2 |
| Grade 4 Vermiculite (g) | 31 | 31 |
| Urea (g) | 0 | 0.9 |
| 10% STMP (g) | 3 | 3 |
| Retarder 1% (g) | 12 | 12 |
| Dispersant (g) | 3 | 3 |
| Water (g) | 855 | 855 |
| Air flow (L/min) | 40 | 40 |
| Soap flow (L/min) | 5 | 5 |
| Foam time (sec) | 15 | 15 |

Table 5 summarizes the thermal performance of the boards made from Table 4. The MW-board shows a similar thermal shrinkage as the MW-Urea board. However, the high-temperature sag of MW-board is higher than that of MW-Urea board, $^{15}/_{16}$" vs. $^{11}/_{16}$". Therefore, the addition of Urea improves the high-temperature sag resistance of the MW-board.

TABLE 5

| Thermal performance of MW-Type X Board with and without Urea | | |
|---|---|---|
| Sample ID | MW | MW-Urea |
| Thermal shrinkage X-Y % | 4.34 ± 0.22 | 4.38 ± 0.34 |
| Thermal Shrinkage Z % | 8.32 ± 0.39 | 8.68 ± 0.42 |
| Thermal Sag (") | $^{15}/_{16}$" | $^{11}/_{16}$" |
| Board Weight (lbs/msf) | 1837 | 1825 |

Example 3: Heavy Board (>2100 #/Msf) with and without Urea

GF-High Salt and MW-High Salt boards were prepared with and without Urea. Table 6 is the formula for making High Salt boards with GF and MW.

TABLE 6

| Formula for High Salt boards with and without Urea | | | | |
|---|---|---|---|---|
| | High Salt | | | |
| Sample ID | GF | GF-Urea | MW | MW-Urea |
| Thickness (inches) | $^5/_8$" (1.5875 cm) | $^5/_8$" | $^5/_8$" | $^5/_8$" |
| Stucco (g) | 900 | 900 | 900 | 900 |
| Accelerator (g) | 9 | 9 | 9 | 9 |
| Pregelatinized, partially hydrolyzed starch (g) | 2 | 2 | 2 | 2 |
| Fiber Glass (g) | 2.8 | 2.8 | 0 | 0 |
| Mineral Wool (g) | 0 | 0 | 6.7 | 6.7 |
| Urea (g) | 0 | 0.9 | 0 | 0.9 |
| 10% STMP (g) | 3 | 3 | 3 | 3 |
| Retarder 1% (g) | 12 | 12 | 12 | 12 |
| Dispersant (g) | 3 | 3 | 3 | 3 |
| Water (g) | 845 | 845 | 845 | 845 |
| Air flow (L/min) | 40 | 40 | 40 | 40 |
| Soap flow (L/min) | 5 | 5 | 5 | 5 |
| Foam time (sec) | 6 | 6 | 6 | 6 |

Table 7 summarizes the thermal performance of the boards made from Table 6. Irrespective of the GF-added or the MW-added boards, the addition of urea seems no impact on the high-temperature sag performance. Therefore, urea is used for making wallboard with a board weight less than 2100 lbs/msf (that is, ultralight weight boards).

TABLE 7

| Thermal Shrinkage and High-Temperature Sag of Type X with and without Urea | | | | |
|---|---|---|---|---|
| | Type X | | | |
| Sample ID | GF | GF-Urea | MW | MW-Urea |
| Thermal shrinkage X-Y % | 5.28 ± 0.25 | 5.34 ± 0.28 | 5.22 ± 0.32 | 4.95 ± 0.22 |
| Thermal Shrinkage Z % | 10.71 ± 0.14 | 11.23 ± 0.58 | 10.68 ± 0.71 | 11.31 ± 0.62 |
| Thermal Sag (") | $2^1/_{16}$" | $2^3/_{16}$" | $1^3/_{16}$" | $1^2/_{16}$" |
| Board Weight (lbs/msf) | 2141 | 2113 | 2135 | 2129 |

Example 4: High Salt, Ultralight Weight Boards
with and without Urea

Table 8 is the formula for making the high salt, ultralight weight boards with and without Urea. Chloride source is from a mixture of sodium chloride and magnesium chloride. The total chloride concentration is 1000 ppm to Stucco.

TABLE 8

Formula for high salt ultralight weight board with and without Urea

| | Sample ID | | | | | |
| | GF-1000 ppm | GF-Clay-1000 ppm | GF-Clay-Urea-1000 ppm | MW-1000 ppm | MW-Clay-1000 ppm | MW-Clay-Urea-1000 ppm |
|---|---|---|---|---|---|---|
| Thickness (inches) | $\frac{5}{8}$" | $\frac{5}{8}$" | $\frac{5}{8}$" | $\frac{5}{8}$" | $\frac{5}{8}$" | $\frac{5}{8}$" |
| Stucco (g) | 900 | 900 | 900 | 900 | 900 | 900 |
| Accelerator (g) | 9 | 9 | 9 | 9 | 9 | 9 |
| pregelatinized starch (g) | 5 | 5 | 5 | 5 | 5 | 5 |
| Fiber Glass (g) | 4.65 | 4.65 | 4.65 | 0 | 0 | 0 |
| Grade 4 Vermiculite (g) | 31 | 31 | 31 | 31 | 31 | 31 |
| Mineral Wool (g) | 0 | 0 | 0 | 11.2 | 11.2 | 11.2 |
| NaCl (g) | 0.62 | 0.62 | 0.62 | 0.62 | 0.62 | 0.62 |
| MgCl2 (g) | 0.6 | 0.6 | 0.6 | 0.6 | 0.6 | 0.6 |
| Clay (g) | 0 | 11 | 11 | 0 | 11 | 11 |
| Urea (g) | 0 | 0 | 0.9 | 0 | 0 | 0.9 |
| 10% STMP (g) | 3 | 3 | 3 | 3 | 3 | 3 |
| Retarder 1% (g) | 12 | 12 | 12 | 12 | 12 | 12 |
| Dispersant (g) | 3 | 3 | 3 | 3 | 3 | 3 |
| Water (g) | 855 | 855 | 855 | 855 | 855 | 855 |
| Air flow (L/min) | 40 | 40 | 40 | 40 | 40 | 40 |
| Soap flow (L/min) | 5 | 5 | 5 | 5 | 5 | 5 |
| Foam time (sec) | 15 | 15 | 15 | 15 | 15 | 15 |

Table 9 summarizes the thermal performance from the high salt ultralight weight boards in Table 8. The chloride salts severely reduce the thermal shrinkage and the high-temperature sag, as shown as GF-1000 ppm and MW-1000 ppm in Table 9. The addition of clay improves the thermal shrinkage and the high-temperature sag, as shown as GF-Clay-1000 ppm and MW-Clay-1000 ppm. The addition of urea further improves the high-temperature sag performance, as shown as GF-Clay—Urea-1000 ppm and MW-Clay-Urea-1000 ppm in Table 9.

TABLE 9

Thermal Shrinkage and High-Temperature Sag of high salt Ultralight weight boards with and without Urea

| | Sample ID | | | | | |
| | GF-1000 ppm | GF-Clay-1000 ppm | GF-Clay-Urea-1000 ppm | MW-1000 ppm | MW-Clay-1000 ppm | MW-Clay-Urea-1000 ppm |
|---|---|---|---|---|---|---|
| Thermal shrinkage X-Y % | 6.79 ± 0.21 | 4.58 ± 0.15 | 4.78 ± 0.47 | 6.81 ± 0.12 | 4.26 ± 0.46 | 4.85 ± 0.22 |
| Thermal Shrinkage Z % | 12.31 ± 0.02 | 6.76 ± 0.44 | 6.93 ± 0.58 | 11.18 ± 1.30 | 6.45 ± 0.31 | 6.49 ± 0.53 |
| Thermal Sag (inches) | >2" (fell) | 1$\frac{5}{16}$" | $\frac{15}{16}$" | >2" (fell) | $\frac{15}{16}$" | $\frac{10}{16}$" |
| Board Weight (lbs/msf) | 1848 | 1827 | 1809 | 1811 | 1817 | 1821 |

Example 5: Glass Fiber Boards without STMP

Table 10 shows the formula for making glass fiber boards without STMP.

TABLE 10

| Sample | Glass Fiber | Glass Fiber-Urea |
|---|---|---|
| Thickness (inches) | $\frac{5}{8}$" | $\frac{5}{8}$" |
| Stucco (g) | 900 | 900 |
| Accelerator (g) | 9 | 9 |
| Pregelatinized, partially hydrolyzed starch (g) | 5 | 5 |

TABLE 10-continued

| Sample | Glass Fiber | Glass Fiber-Urea |
|---|---|---|
| Glass fiber (g) | 4.65 | 4.65 |
| Grade 4 vermiculite (g) | 31 | 31 |
| Urea (g) | 0 | 0.9 |
| 10% sodium trimetaphosphate (STMP) (g) | 0 | 0 |
| Retarder 1% (g) | 12 | 12 |
| Dispersant (g) | 3 | 3 |
| Water (g) | 906 | 906 |
| Air flow (L/min) | 40 | 40 |
| Soap flow (L/min) | 5 | 5 |
| Foam time (sec) | 15 | 15 |

Table 11 shows the thermal performance of the boards in Table 10. The addition of urea improves the high temperature sag resistance of the glass fiber ("GF") added board even when STMP is not added.

TABLE 11

| Sample | Glass fiber | Glass fiber-Urea |
|---|---|---|
| Thermal shrinkage X-y % | 4.67 ± 0.41 | 5.24 ± 0.32 |
| Thermal shrinkage Z % | 7.28 ± 0.11 | 8.17 ± 0.71 |
| High temperature sage (") | 1¹/₁₆" | ¹³/₁₆" |
| Board weight (lbs/msf) | 1832 | 1851 |

Example 6: Glass Fiber Gypsum Board with and without Urea

Table 12 shows the composition of the gypsum core of this example. The boards were made at a plant.

TABLE 12

| Sample | Glass Fiber | Glass Fiber-Urea |
|---|---|---|
| Thickness (inches) | ⅝" | ⅝" |
| Stucco (lbs/msf) | 1485 | 1487 |
| Accelerator (lbs/msf) | 3.5 | 3.5 |
| Pregelatinized, partially hydrolyzed starch (lbs/msf) | 12.1 | 12.1 |
| Glass fiber (lbs/msf) | 7.6 | 7.6 |
| Grade 4 vermiculite (lbs/msf) | 55 | 55 |
| Urea (lbs/msf) | 0 | 1.5 |
| Sodium trimetaphosphate (lbs/msf) | 1.0 | 1.0 |
| Retarder 1% (lbs/msf) | 0.235 | 0.234 |
| Dispersant (lbs/msf) | 4.0 | 4.0 |
| Water (lbs/msf) | 1261 | 1260 |
| Soap (lbs/msf) | 0.521 | 0.518 |
| Foam Air (cubic feet/msf) | 17.29 | 17.40 |
| Water to Stucco Ratio (%) | 85.1 | 85.2 |

Table 13 shows the thermal performance of the boards in Table 12. The addition of urea improves the high temperature sag resistance.

TABLE 13

| Plant Boards | Glass fiber | Glass fiber-Urea |
|---|---|---|
| Thermal shrinkage X-Y % | 6.63 ± 0.40 | 6.44 ± 0.41 |
| Thermal shrinkage Z % | 3.37 ± 0.81 | 2.27 ± 0.44 |
| High temperature sag (inches) | 1¹⁵/₁₆" | 1²/₁₆" |
| Board weight (lbs/msf) | 1886 | 1856 |

CLAUSES OF THE INVENTION

The following clauses describe various aspects of the invention.

Clause 1. A gypsum board comprising:

a gypsum core layer (also referred to as a board core layer) comprising at least 60 wt. % calcium sulfate dihydrate, preferably at least 70 wt. %, and more preferably at least 80 wt. %, typically at least 90 wt. % or at least 95 wt. % calcium sulfate dihydrate, and 0.03-1 wt. %, preferably 0.05-0.8 wt. %, more preferably 0.06-0.6 wt. %, most preferably 0.05-0.2 wt. % for example 0.05-0.1 wt. % or 0.1-0.2 wt. %, urea distributed uniformly throughout the gypsum core, wherein the gypsum core layer has a density of about 40 pounds per cubic foot or less, and wherein the gypsum board has a mass of pounds per area less than 2100 lbs/msf, wherein the mass of pounds per area lbs/msf values are for a ⅝ inch (1.59 cm) thick board and subject to proportional adjustment for thicker or thinner boards.

Clause 2. The gypsum board of clause 1, wherein the gypsum core layer further comprises high expansion particles having a volume expansion of about 200% or more of their original volume after being heated for about one hour at about 1500° F.

Clause 3. The gypsum board of clause 2, wherein the gypsum core layer further comprises 0-0.1% sodium trimetaphosphate, typically 0.02-0.05% sodium trimetaphosphate.

Clause 4. The gypsum board of any of clauses 1-3, further comprising less than 120 ppm chloride per 1,000,000 parts by weight of said calcium sulfate dihydrate.

Clause 5. The gypsum board of any of clauses 1-3, further comprising about 120 ppm to about 3000 ppm chloride per 1,000,000 parts by weight of said calcium sulfate dihydrate.

Clause 6. The gypsum board of clause 1, wherein the gypsum core layer has opposed front and back outer surfaces, further comprising a front cover sheet on the gypsum core front surface and a back cover sheet on the gypsum core back surface.

Clause 7. The gypsum board of clause 1, wherein the front and/or back cover sheets are made of paper or fiberglass.

Clause 8. The gypsum board of clause 1, wherein the gypsum core layer further comprises about 0.1-3.0% by weight of fiber-reinforced such as mineral wool, glass fiber or carbon fiber.

Clause 9. The gypsum board of clause 1, further comprising a skim layer comprising at least 60 wt. % calcium sulfate dihydrate on at least one side of the gypsum core layer, said skim layer having a density at least 1.1 times higher than the density of the gypsum core layer.

Clause 10. The gypsum board of clause 9, wherein the skim layer further comprises 0.03-1 wt. %, 0.05-0.8 wt. %, 0.06-0.6 wt. %, 0.05-0.2 wt. % urea.

Clause 11. The gypsum board of clause 1, wherein the board has a thickness of ⅜"-1", preferably ⅝".

Clause 12. The gypsum board of clause 1, further comprising a skim layer comprising at least 60 wt. % calcium sulfate dihydrate, and 0.03-1 wt. %, 0.05-0.8 wt. %, 0.06-0.6 wt. %, 0.05-0.2 wt. % urea.

Clause 13. The gypsum board of clause 1, wherein the gypsum core layer is effective to provide a Thermal Insulation Index (TI) of about 20 minute, for example greater than 30.0 minutes.

Clause 14. The gypsum board of clause 1, wherein the gypsum core layer is effective to provide a High Temperature Shrinkage (S) of about 10% or less.

Clause 15. A gypsum board having a gypsum core layer made from a mixture of:

at least 60 wt. % on a dry basis calcium sulfate hemihydrate, 0.03-1 wt. %, preferably 0.05-0.8 wt. %, more preferably 0.06-0.6 wt. %, most preferably 0.05-0.2 wt. %, for example 0.05-0.1 wt. % or 0.1-0.2 wt. %, on a dry basis urea, an accelerator, glass fiber or mineral wool, pregelatinized, partially hydrolyzed starch, vermiculite, retarder, dispersant, optionally sodium trimetaphosphate, optionally clay, optionally sodium chloride, optionally magnesium chloride, and water.

Clause 16. The gypsum board of clause 15, wherein the gypsum core layer has a density of about 40 pounds per cubic foot or less, and wherein the gypsum board has a mass of pounds per area less than 2100 lbs/msf, wherein the mass of pounds per area lbs/msf values are for a ⅝ inch (1.59 cm) thick board and subject to proportional adjustment for thicker or thinner boards.

Clause 17. The gypsum board of clause 15 or 16, wherein the gypsum core layer further comprises 0-0.1% sodium trimetaphosphate, typically 0.02-0.05% sodium trimetaphosphate.

Clause 18. The gypsum board of clause 15, 16 or 17, further comprising less than 120 ppm chloride per 1,000,000 parts by weight of said calcium sulfate hemihydrate.

Clause 19. The gypsum board of clause 15, 16 or 17, further comprising about 120 ppm to about 3000 ppm chloride per 1,000,000 parts by weight of said calcium sulfate hemihydrate.

Clause 20. The gypsum board of clause 15, 16 or 17, wherein the gypsum core layer has opposed front and back outer surfaces, further comprising a front cover sheet on the gypsum core front surface and a back cover sheet on the gypsum core back surface.

Clause 21. The gypsum board of clause 15, 16 or 17, wherein the front and/or back cover sheets are made of paper or fiberglass.

Clause 22. The gypsum board of clause 15, 16 or 17, wherein the gypsum core layer further comprises about 0.1-3.0% by weight of fiber-reinforced such as mineral wool, glass fiber or carbon fiber.

Clause 23. The gypsum board of clause 15, 16 or 17, further comprising a skim layer comprising at least 60 wt. % calcium sulfate dihydrate on at least one side of the gypsum core layer, said skim layer having a density at least 1.1 times higher than the density of the gypsum core layer.

Clause 24. The gypsum board of clause 23, wherein the skim layer further comprises 0.03-1 wt. %, 0.05-0.8 wt. %, 0.06-0.6 wt. %, 0.05-0.2 wt. % urea.

Clause 25. The gypsum board of clause 15, 16 or 17, wherein the board has a thickness of ⅜"-1", preferably ⅝".

Clause 26. The gypsum board of clause 15, 16 or 17, further comprising a skim layer comprising at least 60 wt. % calcium sulfate dihydrate, and 0.03-1 wt. %, 0.05-0.8 wt. %, 0.06-0.6 wt. %, 0.05-0.2 wt. % urea.

Clause 27. The gypsum board of clause 15, 16 or 17, wherein the gypsum core layer is effective to provide a Thermal Insulation Index (TI) of about 20 minute, for example greater than 30.0 minutes.

Clause 28. The gypsum board of clause 15, 16 or 17, wherein the gypsum core layer is effective to provide a High Temperature Shrinkage (S) of about 10% or less.

Clause 29. A method of making a gypsum board of any of clauses 1-28, comprising:

preparing an aqueous gypsum slurry comprising a mixture of water and stucco, wherein the stucco comprises calcium sulfate hemihydrate, and wherein the aqueous gypsum slurry comprises a mixture of:

at least 60 weight percent of said calcium sulfate hemihydrate on a dry basis, 0.03-1 wt. % urea on a dry basis, and the water at a weight ratio of water to the calcium sulfate hemihydrate of 0.2:1 to 1.2:1;

disposing the aqueous gypsum slurry onto a surface and allowing the aqueous gypsum slurry to set to form a set gypsum core layer comprising calcium sulfate dihydrate;

cutting the set gypsum core layer into a panel of predetermined dimensions; and drying the panel, wherein the gypsum core layer has a density of about 40 pounds per cubic foot or less, wherein the gypsum board has a mass of pounds per area less than 2100 lb s/msf, wherein the mass of pounds per area lbs/msf values are for a ⅝ inch (1.59 cm) thick board and subject to proportional adjustment for thicker or thinner boards.

Clause 30. The method of clause 29, wherein the aqueous slurry is disposed between a front cover sheet and a back cover sheet, each cover sheet having an inner surface and an outer surface;

wherein the aqueous slurry contacts the inner surface of the front cover sheet and the back cover sheet, and at least a portion of the aqueous slurry is in a foamed state while being disposed between the front cover sheet and the back cover sheet.

Clause 31. The method of clause 29, wherein the front and back cover sheets comprise woven fibers.

Clause 32. The method of clause 29, wherein the front and back cover sheets comprise non-woven fibers.

Clause 33. The method of clause 29, wherein the front and back cover sheets comprise paper.

Variations of the specifically disclosed invention may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to") unless otherwise noted. Recitation of ranges of values herein are intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. The claims set forth below are also part of the disclosure of the invention.

The invention claimed is:

1. A gypsum board comprising:
a gypsum core layer comprising
at least 70 wt. % calcium sulfate dihydrate,
and
0.2-0.5 wt. % urea distributed uniformly throughout the gypsum core,
0.1 to 1.0 wt. % glass fiber or 0.5 to 10 wt. % mineral wool as reinforcing material,
0.5 to 3 wt. % pregelatinized, partially hydrolyzed starch,
0 to 0.4 wt. % phosphate,
0 to 1.0 wt. % dispersant,
optionally vermiculite,
optionally an accelerator,
optionally a retarder,
and an absence of clay additive,
wherein the gypsum core layer results from setting of a mixture comprising an addition of urea provided in dry form or an aqueous solution admixed to an aqueous slurry comprising calcium sulfate hemihydrate and water,
wherein the gypsum core has air voids,
wherein the gypsum core layer has a density of 30-40 pounds per cubic foot, and
wherein the gypsum board has a mass of pounds per area 1600 to 1886 lbs/msf, wherein the mass of pounds per area lbs/msf values are for a ⅝ inch thick board and subject to proportional adjustment for thicker or thinner boards,
wherein the board has a thickness of ⅜"-1",
wherein the gypsum core layer has opposed front and back outer surfaces, further comprising a front cover sheet on the gypsum core front surface and a back cover sheet on the gypsum core back surface, and
wherein the front and/or back cover sheets are made of paper or fiberglass.

2. The gypsum board of claim 1, wherein the gypsum board has a mass of pounds per area 1600 to 1856 lbs/msf, wherein the mass of pounds per area lbs/msf values are for a ⅝ inch thick board and subject to proportional adjustment for thicker or thinner boards.

3. The gypsum board of claim 2, wherein the gypsum core layer further comprises 0-0.1% sodium trimetaphosphate.

4. The gypsum board of claim 1, further comprising less than 120 parts by weight chloride per 1,000,000 parts by weight of said calcium sulfate dihydrate.

5. The gypsum board of claim 1, further comprising about 120 parts by weight to about 3000 parts by weight chloride per 1,000,000 parts by weight of said calcium sulfate dihydrate.

6. The gypsum board of claim 1, wherein the front and/or back cover sheets are made of paper, wherein the gypsum core layer has mass of pounds per area 1600 to 1856 lbs/msf, wherein the mass of pounds per area lbs/msf values are for a ⅝ inch thick board and subject to proportional adjustment for thicker or thinner boards.

7. The gypsum board of claim 1, wherein the gypsum core layer has mass of pounds per area 1809 to 1856 lbs/msf, wherein the mass of pounds per area lbs/msf values are for a ⅝ inch thick board and subject to proportional adjustment for thicker or thinner boards.

8. The gypsum board of claim 1, further comprising a skim layer that has a thickness ("T1") of from about 0.02 inches (about 0.05 cm) to about 0.2 inches (about 0.5 cm) comprising at least 60 wt. % calcium sulfate dihydrate on at least one side of the gypsum core layer, said skim layer having a density at least 1.1 times higher than the density of the core layer.

9. The gypsum board of claim 8, wherein the skim layer further comprises 0.05-0.5 wt. % urea.

10. The gypsum board of claim 9,
wherein the board has a thickness of ⅜"-0.75",
and
wherein the board mass of pounds per area is 1600 to 1856 lbs/msf, wherein the mass of pounds per area lbs/msf values are for a ⅝ inch thick board and subject to proportional adjustment for thicker or thinner boards.

11. The gypsum board of claim 10, wherein the gypsum board has a mass of pounds per area 1809 to 1856 lbs/msf, wherein the mass of pounds per area lbs/msf values are for a ⅝ inch thick board and subject to proportional adjustment for thicker or thinner boards.

12. The gypsum board of claim 1,
wherein a thermal sag is measured according to a thermal sag test that is 10-30%, of the thermal sag observed in a control boards of the same gypsum board composition without the urea, wherein the thermal sag test is conducted on 10"×1.5"×⅝" strips were cut from the cast boards, placed horizontally in a furnace on bricks (2.5" high) spaced 8" apart in the middle of the heated space, the furnace heated from ambient temperature to 1600° F. (870° C.) in about 75 minutes, and then maintained at 1600° F. (870° C.) for 15 minutes for a total heating time was 90 minutes.

13. The gypsum board of claim 1, wherein the gypsum core layer provides a High Temperature Shrinkage (S) of about 10% or less, the gypsum board has High Temperature Shrinkage (S) measured at about 1560° F. (850° C.) according to ASTM Pub. WK25392 of 10% or less,
wherein the board has a thickness of ⅜"-0.75", and
wherein the board mass of pounds per area is 1809 to less than 1886 lbs/msf.

14. The gypsum board of claim 1, made by a method of making the gypsum board, comprising:
preparing an aqueous gypsum slurry comprising a mixture of water and stucco, wherein the stucco comprises calcium sulfate hemihydrate, and wherein the aqueous gypsum slurry comprises a mixture of:

at least 70 weight percent of said calcium sulfate hemihydrate on a dry basis, 0.2-0.5 wt. %-urea on a dry basis, 0.1 to 1.0 wt. % glass fiber or 0.5 to 10 wt. % mineral wool as reinforcing material, 0.5 to 3 wt. % pregelatinized, partially hydrolyzed starch, 0 to 0.4 wt. % phosphate, 0 to 1.0 wt. % dispersant, optionally vermiculite, an accelerator, optionally a retarder, and water at a weight ratio of water to the calcium sulfate hemihydrate of 0.2:1 to 1.2:1;

disposing the aqueous gypsum slurry onto a surface and allowing the aqueous gypsum slurry to set to form a set gypsum core layer comprising calcium sulfate dihydrate;

wherein the aqueous slurry is disposed between a front cover sheet and a back cover sheet, each cover sheet having an inner surface and an outer surface;

wherein the aqueous slurry contacts the inner surface of the front cover sheet and the back cover sheet, and at least a portion of the aqueous slurry is in a foamed state while being disposed between the front cover sheet and the back cover sheet;

cutting the set gypsum core layer into a panel of predetermined dimensions; and drying the panel, wherein the set gypsum core layer has a density of 30-40 pounds per cubic foot or less, wherein the gypsum board has a mass of pounds per area less than 2100 lbs/msf, wherein the mass of pounds per area lbs/msf values are for a ⅝ inch thick board and subject to proportional adjustment for thicker or thinner boards, wherein the board has a thickness of ⅜"-1", wherein the gypsum core layer has opposed front and back outer surfaces, further comprising a front cover sheet on the gypsum core front surface and a back cover sheet on the gypsum core back surface, and wherein the front and/or back cover sheets are made of paper or fiberglass.

15. The gypsum board of claim 14, wherein the gypsum board has a mass of pounds per area 1600-1856 lbs/msf, wherein the mass of pounds per area lbs/msf values are for a ⅝ inch thick board and subject to proportional adjustment for thicker or thinner boards.

16. A gypsum board having a gypsum core layer between front and back cover sheets, the gypsum core layer made from a mixture of:

an aqueous slurry comprising water and at least 70 wt. % on a dry basis calcium sulfate hemihydrate, 0.03-1 wt. % on a dry basis urea in dry form or an aqueous solution, 0.1 to 1.0 wt. % glass fiber or 0.5 to 10 wt. % mineral wool, 0.5 to 3 wt. % pregelatinized, partially hydrolyzed starch, 0 to 0.4 wt. % phosphate, 0 to 1.0 wt. % dispersant, 0 to 1.0 wt. % dispersant, optionally an accelerator, optionally a retarder, optionally sodium trimetaphosphate, an absence of clay additive, optionally vermiculite, water, and air, wherein the mixture results from a process comprising an addition of urea admixed to the aqueous slurry comprising the calcium sulfate hemihydrate and the water, wherein the gypsum core layer has a density of 30-40 pounds per cubic foot or less, wherein the gypsum board has a mass of pounds per area 1600 to 1886 lbs/msf, wherein the mass of pounds per area lbs/msf values are for a ⅝ inch thick board and subject to proportional adjustment for thicker or thinner boards, wherein the gypsum board has a thickness of ⅜"-1", wherein the gypsum core layer has opposed front and back outer surfaces, the front cover sheet on the gypsum core front surface and the back cover sheet on the gypsum core back surface, and wherein the front and/or back cover sheets are made of paper or fiberglass.

17. A method of making a gypsum board of claim 1, comprising:

preparing an aqueous gypsum slurry comprising a mixture of water and stucco, wherein the stucco comprises calcium sulfate hemihydrate, and wherein the aqueous gypsum slurry comprises a mixture of:

at least 70 weight percent of said calcium sulfate hemihydrate on a dry basis, 0.2-0.5 wt. % urea on a dry basis, 0.1 to 1.0 wt. % glass fiber or 0.5 to 10 wt. % mineral wool as reinforcing material, 0.5 to 3 wt. % pregelatinized, partially hydrolyzed starch, 0 to 0.4 wt. % phosphate, 0 to 1.0 wt. % dispersant, optionally vermiculite, optionally an accelerator, optionally a retarder, an absence of clay additive, and the water at a weight ratio of water to the calcium sulfate hemihydrate of 0.2:1 to 1.2:1;

disposing the aqueous gypsum slurry onto a surface and allowing the aqueous gypsum slurry to set to form a set gypsum core layer comprising calcium sulfate dihydrate;

wherein the aqueous slurry is disposed between a front cover sheet and a back cover sheet, each cover sheet having an inner surface and an outer surface;

wherein the aqueous slurry contacts the inner surface of the front cover sheet and the back cover sheet, and at least a portion of the aqueous slurry is in a foamed state while being disposed between the front cover sheet and the back cover sheet;

cutting the set gypsum core layer into a panel of predetermined dimensions; and drying the panel, wherein the set gypsum core layer has a density of 30-40 pounds per cubic foot or less, wherein the gypsum board has a mass of pounds per area less than 2100 lbs/msf, wherein the mass of pounds per area lbs/msf values are for a ⅝ inch thick board and subject to proportional adjustment for thicker or thinner boards, wherein the board has a thickness of ⅜"-1", wherein the gypsum core layer has opposed front and back outer surfaces, further comprising a front cover sheet on the gypsum core front surface and a back cover sheet on the gypsum core back surface, and wherein the front and/or back cover sheets are made of paper or fiberglass.

18. The gypsum board of claim 16, wherein the gypsum board has a mass of pounds per area 1600 to 1856 lbs/msf, wherein the mass of pounds per area lbs/msf values are for a ⅝ inch thick board and subject to proportional adjustment for thicker or thinner boards.

19. The gypsum board of claim 16, wherein the gypsum board has a mass of pounds per area 1809 to less than 1856 lbs/msf, wherein the mass of pounds per area lbs/msf values are for a ⅝ inch thick board and subject to proportional adjustment for thicker or thinner boards.

* * * * *